US009206997B2

(12) United States Patent
Ryan

(10) Patent No.: US 9,206,997 B2
(45) Date of Patent: Dec. 8, 2015

(54) CURVED TRANSPIRED SOLAR AIR HEATER AND CONDUIT

(75) Inventor: Thomas D. Ryan, North Hatley (CA)

(73) Assignee: SYENERGY Integrated Energy Solutions Inc., Magog, QC (CA)

(*) Notice: Subject to any disclaimer, the term of this patent is extended or adjusted under 35 U.S.C. 154(b) by 280 days.

(21) Appl. No.: 13/014,744

(22) Filed: Jan. 27, 2011

(65) Prior Publication Data

US 2011/0120449 A1 May 26, 2011

Related U.S. Application Data

(63) Continuation of application No. PCT/US2009/052158, filed on Jul. 29, 2009.

(60) Provisional application No. 61/084,286, filed on Jul. 29, 2008, provisional application No. 61/084,936, filed on Jul. 30, 2008.

(51) Int. Cl.
*F24J 2/24* (2006.01)
*F24J 2/22* (2006.01)
(Continued)

(52) U.S. Cl.
CPC *F24J 2/28* (2013.01); *F24J 2/0015* (2013.01); *F24J 2/0488* (2013.01); *F24J 2/10* (2013.01); *F24J 2/16* (2013.01); *F24J 2/201* (2013.01); *F24J 2/207* (2013.01); *F24J 2/38* (2013.01); *F24J 2/5233* (2013.01); *F24J 2/5264* (2013.01); *F24J 2/541* (2013.01); *F24J 2002/5486* (2013.01); *Y02B 10/20* (2013.01);
(Continued)

(58) Field of Classification Search
CPC ............... F24J 2/0015; F24J 2/10; F24J 2/16; F24J 2/207; F24J 2/28; F24J 2/38; F24J 2/5233; F24J 2/5264; F24J 2/0488
USPC .............. 126/628, 651, 675, 670, 672; 34/93; 29/890.033
See application file for complete search history.

(56) References Cited

U.S. PATENT DOCUMENTS

| 3,875,925 A | 4/1975 | Johnston |
| 4,051,834 A | 10/1977 | Fletcher |

(Continued)

FOREIGN PATENT DOCUMENTS

| CA | 2467078 A1 | 12/2003 |
| CA | 2503395 A1 | 11/2005 |

(Continued)

OTHER PUBLICATIONS

Notification of Transmittal of the International Search Report and the Written Opinion of the International Searching Authority for PCT/US2009/052158.

*Primary Examiner* — Kenneth Rinehart
*Assistant Examiner* — William Corboy
(74) *Attorney, Agent, or Firm* — James Marc Leas

(57) ABSTRACT

An air heating system is for use with a mechanism for flowing air. The system includes a plenum and a solar absorber. The solar absorber defines a first boundary of the plenum. The solar absorber is permeable to air. The mechanism for flowing air is for pulling air into the plenum through the permeable solar absorber. The plenum has an axial direction, wherein along a cross section of said plenum normal to the axial direction the permeable absorber has an average shape that is substantially convex when the permeable absorber is viewed from outside of the plenum.

39 Claims, 18 Drawing Sheets

(51) Int. Cl.
  *F26B 19/00* (2006.01)
  *B21D 53/06* (2006.01)
  *F24J 2/28* (2006.01)
  *F24J 2/00* (2014.01)
  *F24J 2/04* (2006.01)
  *F24J 2/10* (2006.01)
  *F24J 2/16* (2006.01)
  *F24J 2/20* (2006.01)
  *F24J 2/38* (2014.01)
  *F24J 2/52* (2006.01)
  *F24J 2/54* (2006.01)

(52) U.S. Cl.
  CPC ............... *Y02E 10/44* (2013.01); *Y02E 10/47* (2013.01); *Y10T 29/49355* (2015.01)

(56) References Cited

U.S. PATENT DOCUMENTS

| | | | |
|---|---|---|---|
| 4,186,721 A | 2/1980 | Whitman | |
| 4,219,011 A * | 8/1980 | Knoos | 126/666 |
| 4,226,226 A * | 10/1980 | Knoos | 126/666 |
| 4,243,023 A * | 1/1981 | Rom et al. | 126/674 |
| 4,257,396 A | 3/1981 | Reinert | |
| 4,265,221 A | 5/1981 | Whinnery | |
| 4,285,331 A | 8/1981 | Bloxsom | |
| 4,304,223 A | 12/1981 | Novinger | |
| 4,306,542 A | 12/1981 | Reinert | |
| 4,360,005 A | 11/1982 | Sharpe | |
| 4,404,958 A | 9/1983 | Boettcher | |
| 4,465,058 A * | 8/1984 | Reick | 126/628 |
| 4,777,932 A | 10/1988 | Pennington | |
| 4,899,728 A | 2/1990 | Peter et al. | |
| 4,934,338 A | 6/1990 | Hollick et al. | |
| 5,373,839 A | 12/1994 | Hoang | |
| 5,692,491 A | 12/1997 | Christensen | |
| 5,935,343 A | 8/1999 | Hollick | |
| 7,032,588 B2 | 4/2006 | Hollick | |
| 7,677,243 B2 * | 3/2010 | McClendon | 126/621 |
| 2005/0211238 A1 | 9/2005 | Archibald | |
| 2008/0139106 A1 * | 6/2008 | Vachon | 454/242 |
| 2008/0176504 A1 * | 7/2008 | McClendon | 454/251 |
| 2010/0000520 A1 * | 1/2010 | Vachon | 126/675 |
| 2010/0101562 A1 | 4/2010 | Pellegrino | |

FOREIGN PATENT DOCUMENTS

| | | |
|---|---|---|
| CA | 2559641 A1 | 3/2008 |
| CA | WO2010025537 A1 | 3/2010 |
| CH | 625331 | 9/1981 |
| CN | 101382325 A | 3/2009 |
| CN | 101382342 A | 3/2009 |
| CN | 201335549 Y | 10/2009 |
| CN | 201382594 Y | 1/2010 |
| CN | 201520652 U | 7/2010 |
| DE | 4307981 A1 | 9/1981 |
| DE | 4319027 A1 | 12/1994 |
| DE | 4326559 A1 | 2/1995 |
| DE | 19806533 A1 | 8/1999 |
| DE | 19820156 A1 | 11/1999 |
| DE | 20200004 U1 | 6/2002 |
| DE | 10222834 | 12/2003 |
| DE | 10307540 A1 | 9/2004 |
| DE | 102006005099 A1 | 8/2006 |
| DE | 202006013263 U1 | 1/2007 |
| DE | 102008013686 A1 | 9/2009 |
| ES | WO 2007-113351 | 10/2007 |
| FR | 2908870 | 11/2008 |
| IL | WO 2010-023672 A2 | 3/2010 |
| IL | WO 2010-023672 A3 | 3/2010 |
| JP | 59157439 | 9/1984 |
| JP | 60235950 | 11/1985 |
| JP | 06281262 A | 10/1994 |
| JP | 07083517 B2 | 9/1995 |
| JP | 2006029732 | 2/2006 |
| JP | 2007-132024 | 5/2007 |
| JP | 2007-132024 A | 5/2007 |
| KR | WO 2010-013915 A2 | 2/2010 |
| KR | WO 2010-013986 A2 | 2/2010 |

* cited by examiner

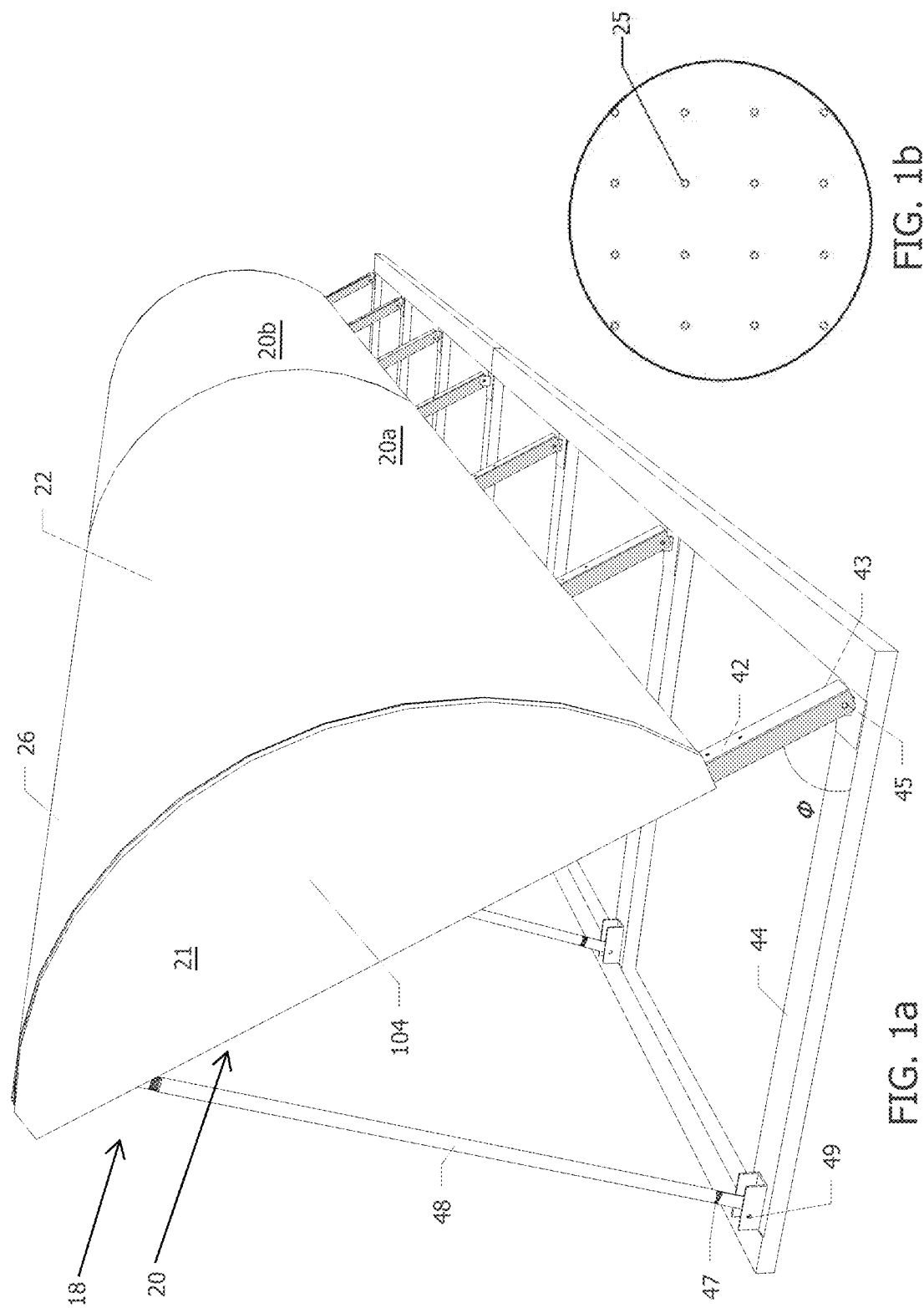

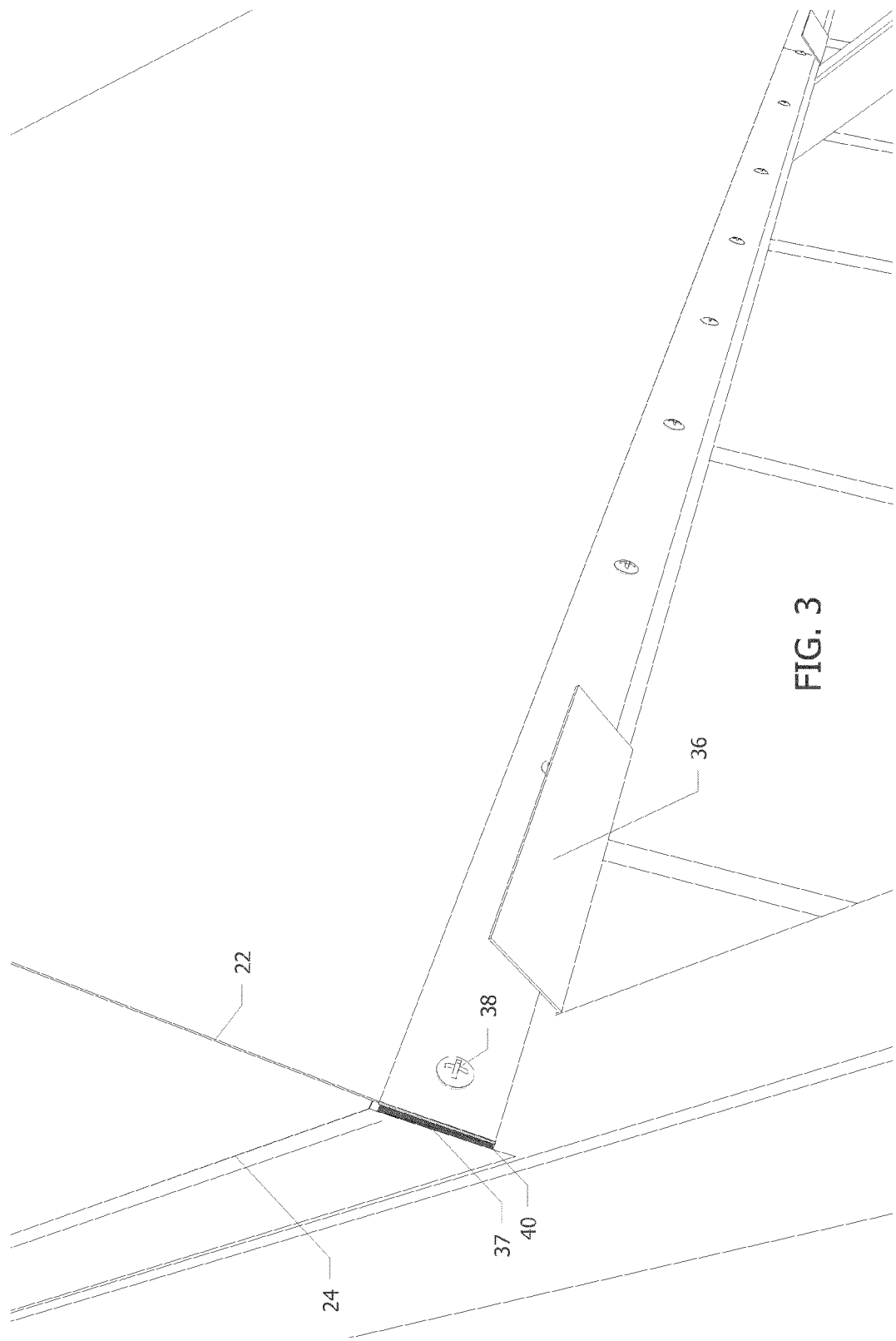

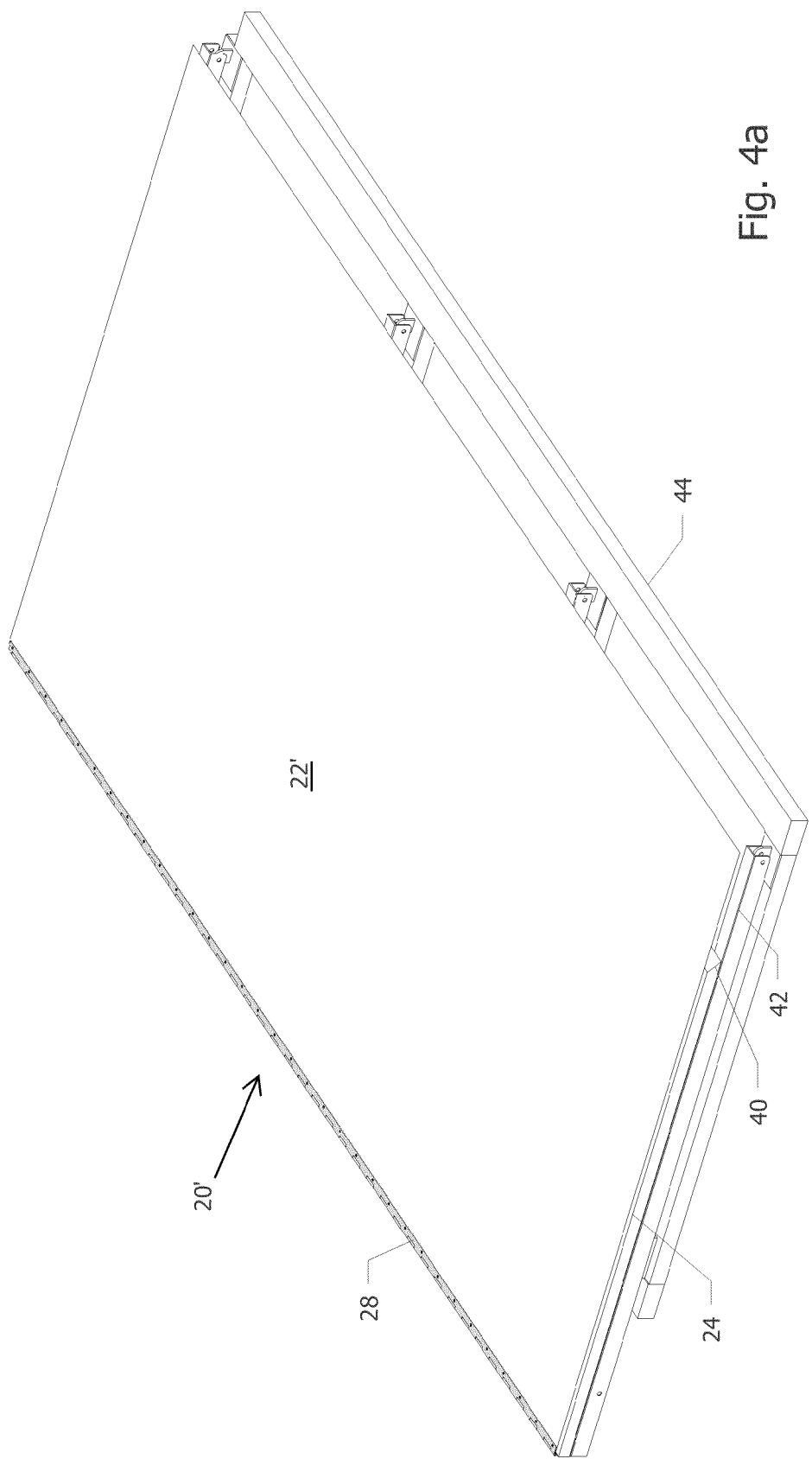

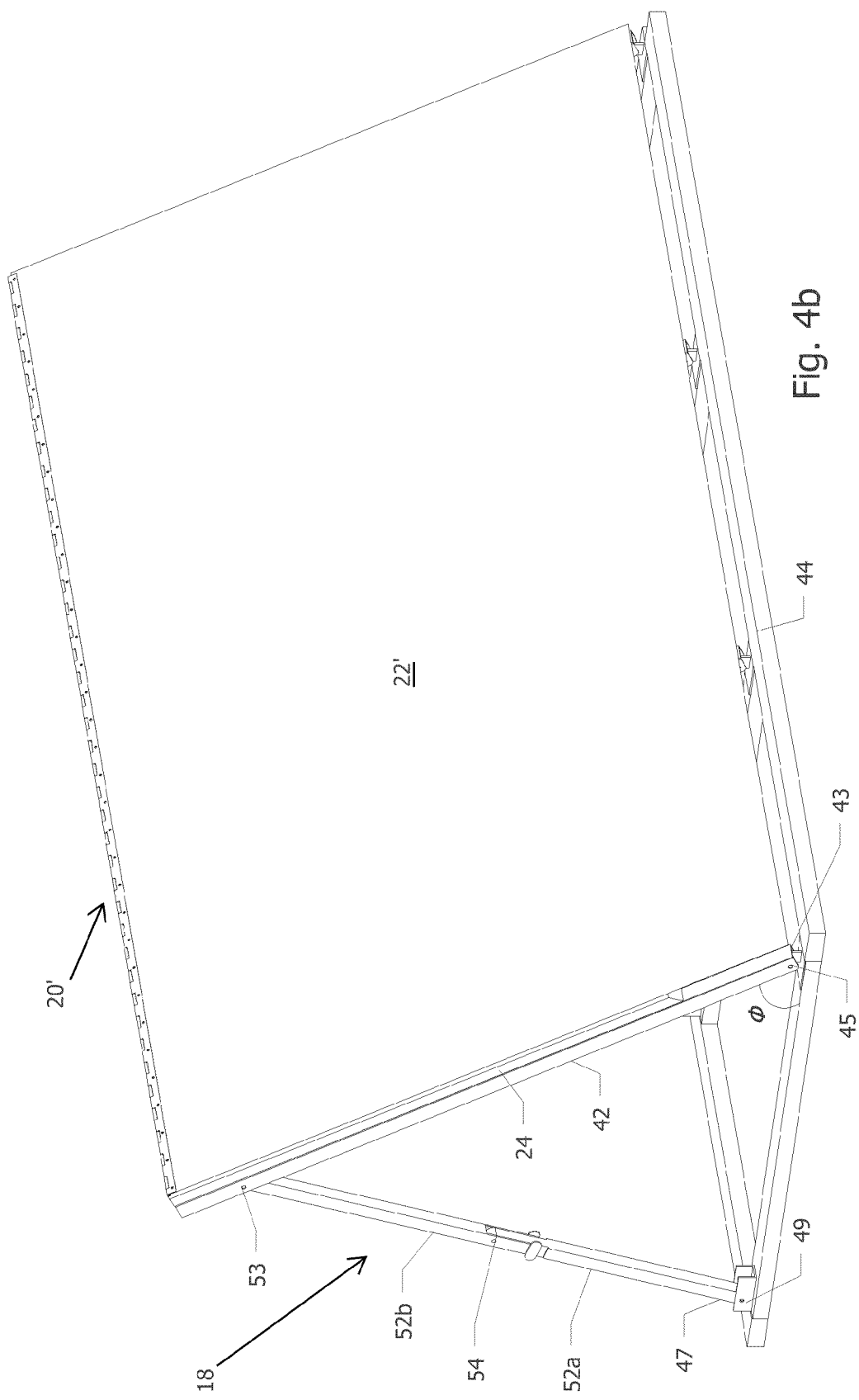

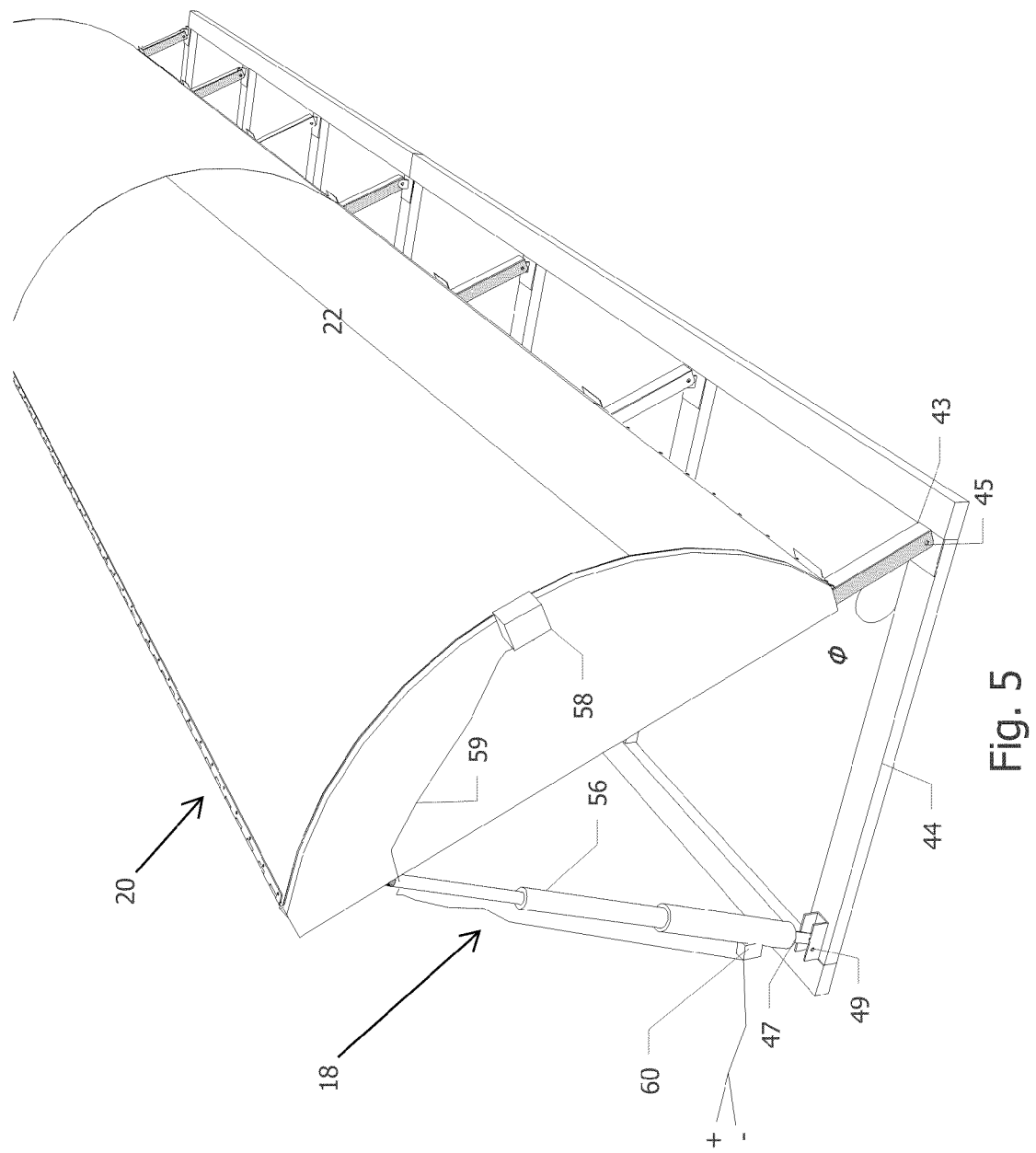

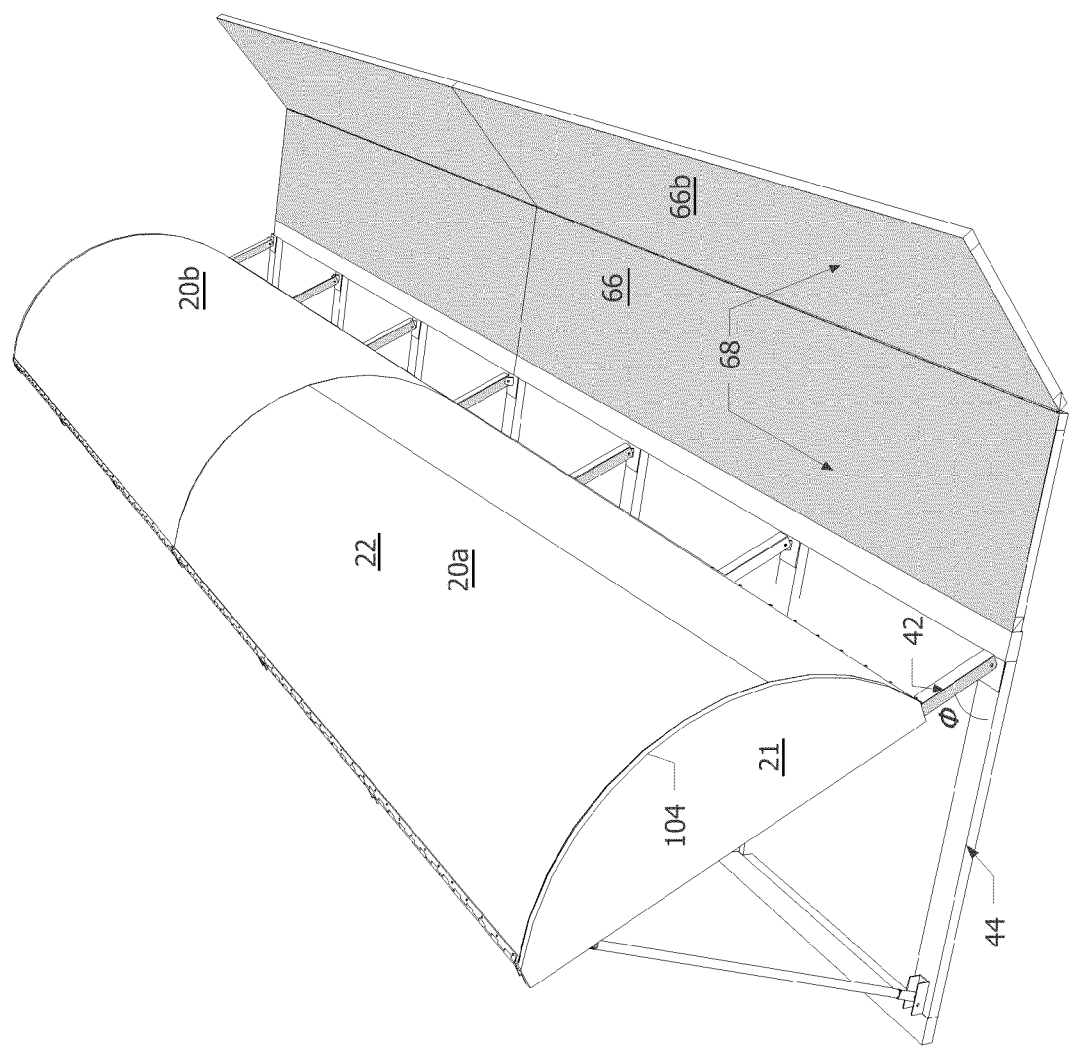

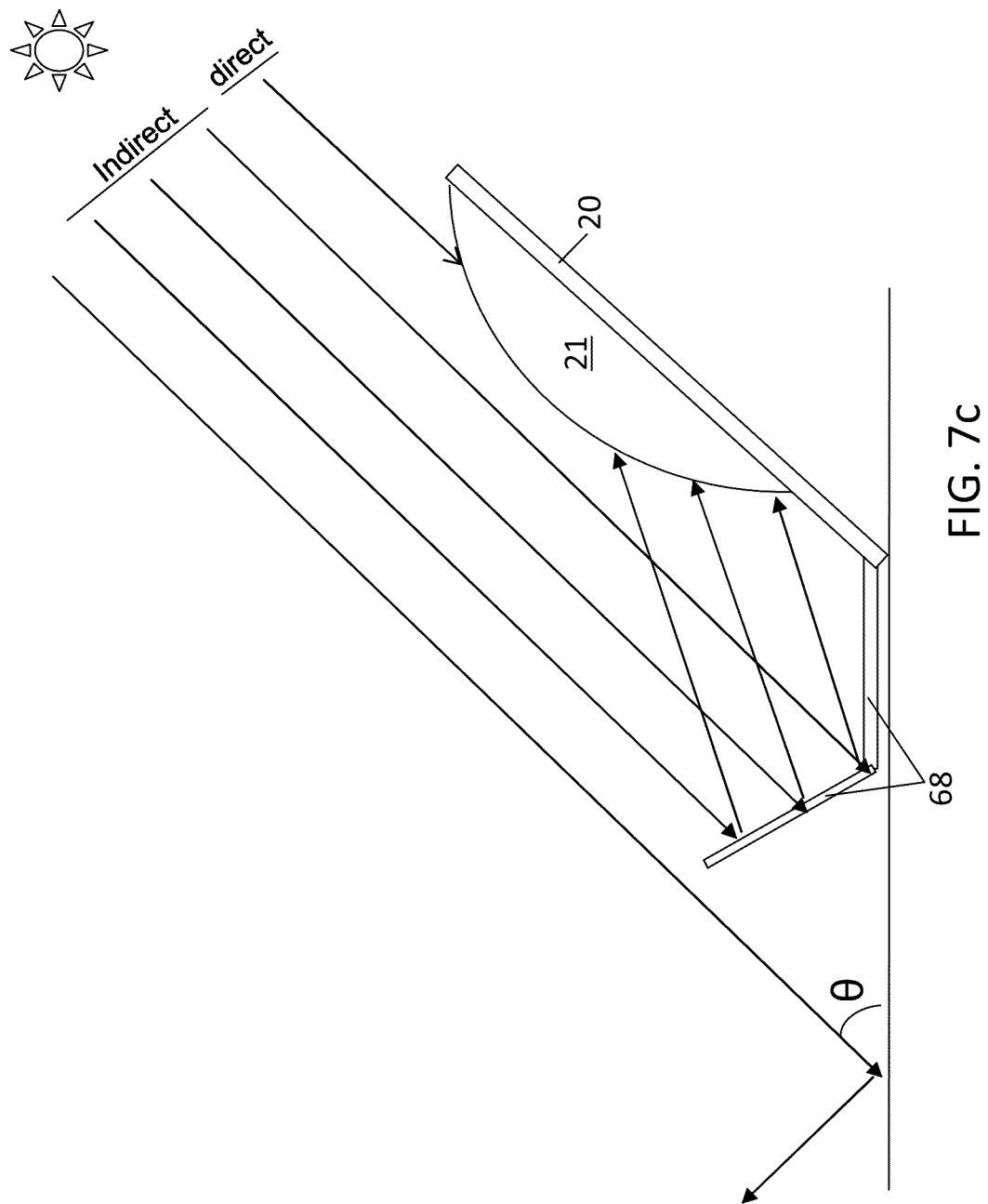

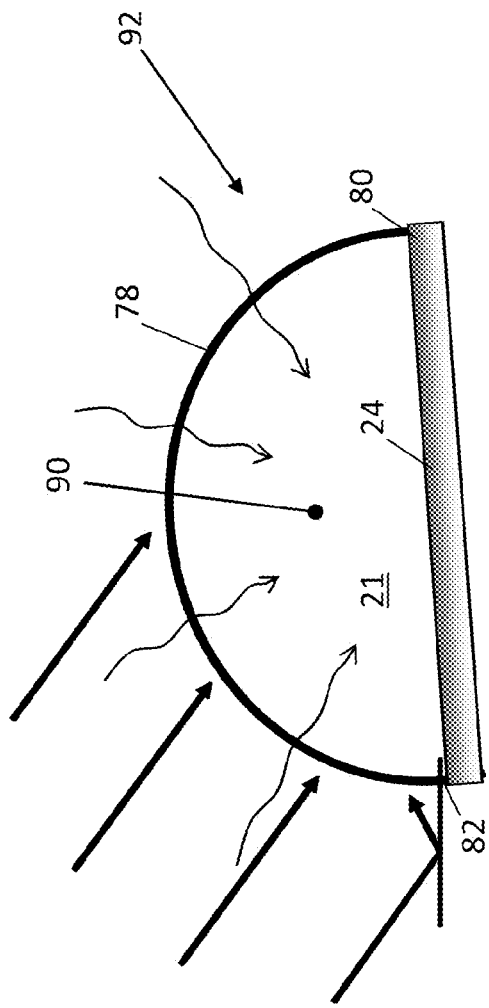
FIG. 8a – Section A-A
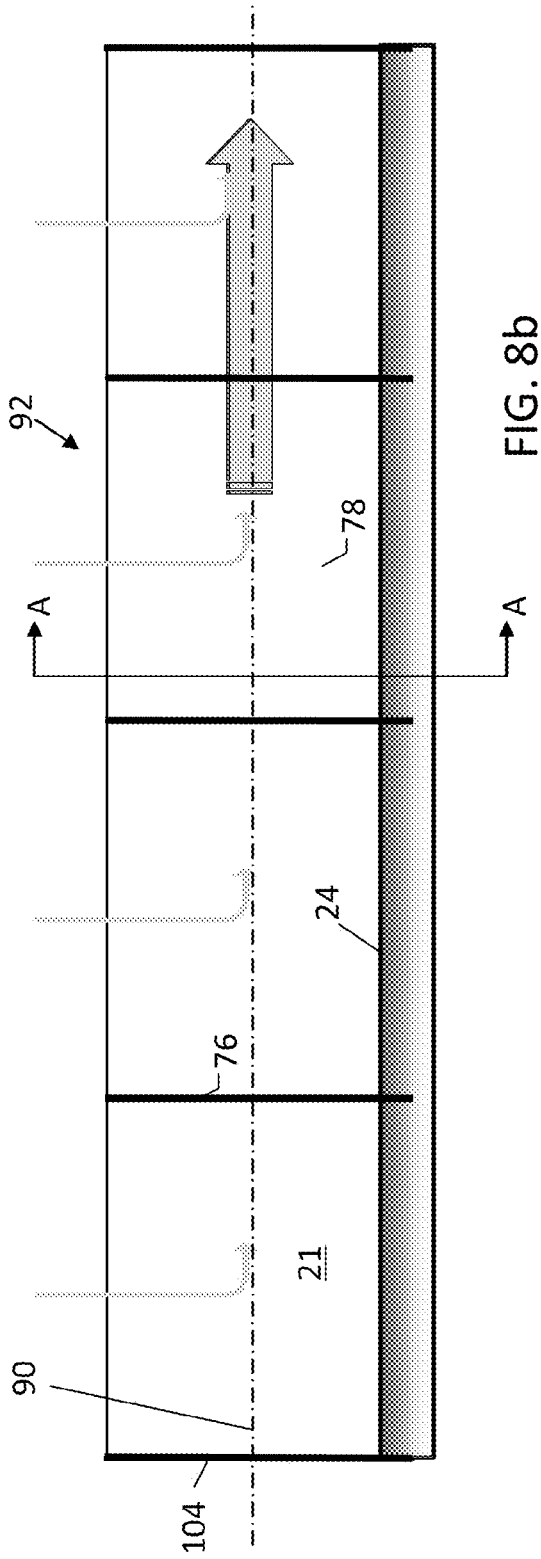
FIG. 8b

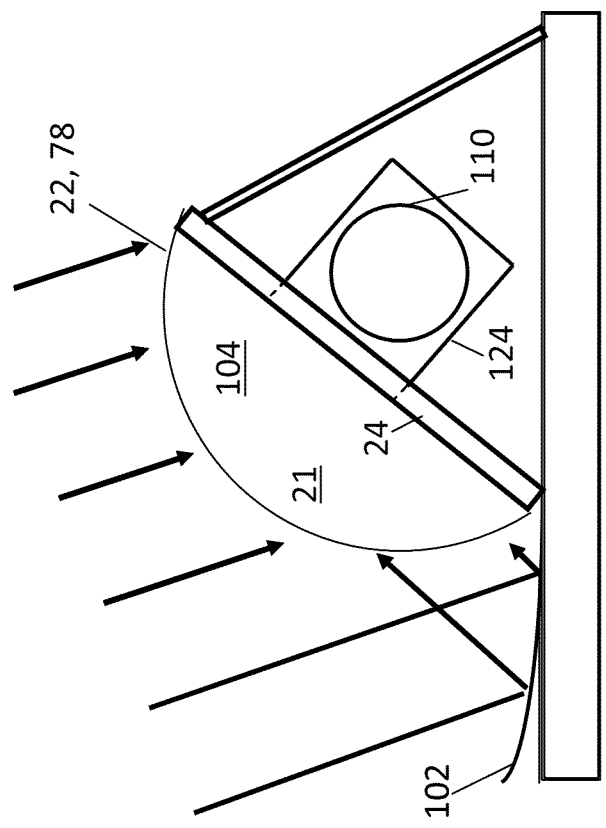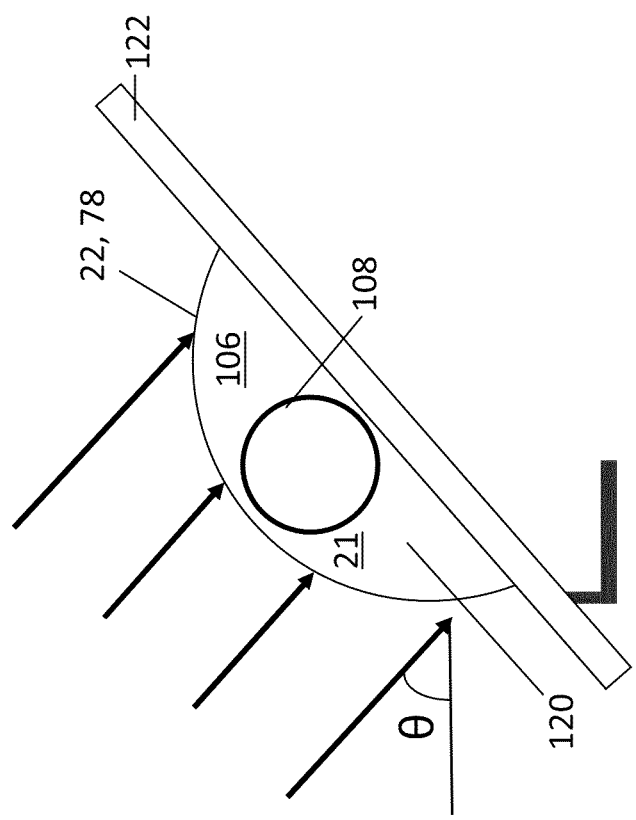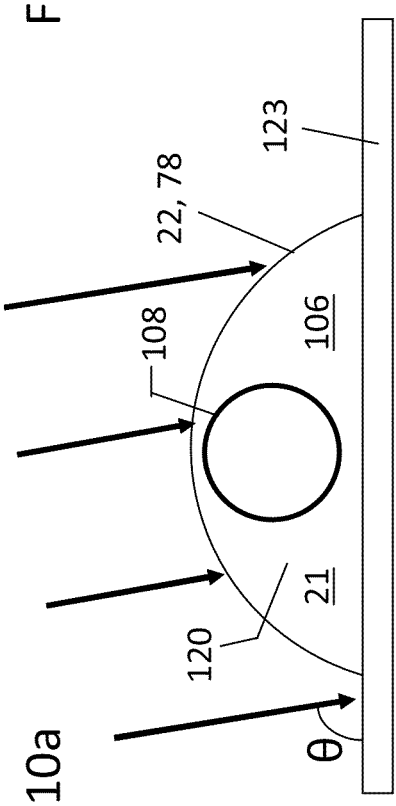
FIG. 10a
FIG. 10b
FIG. 10c

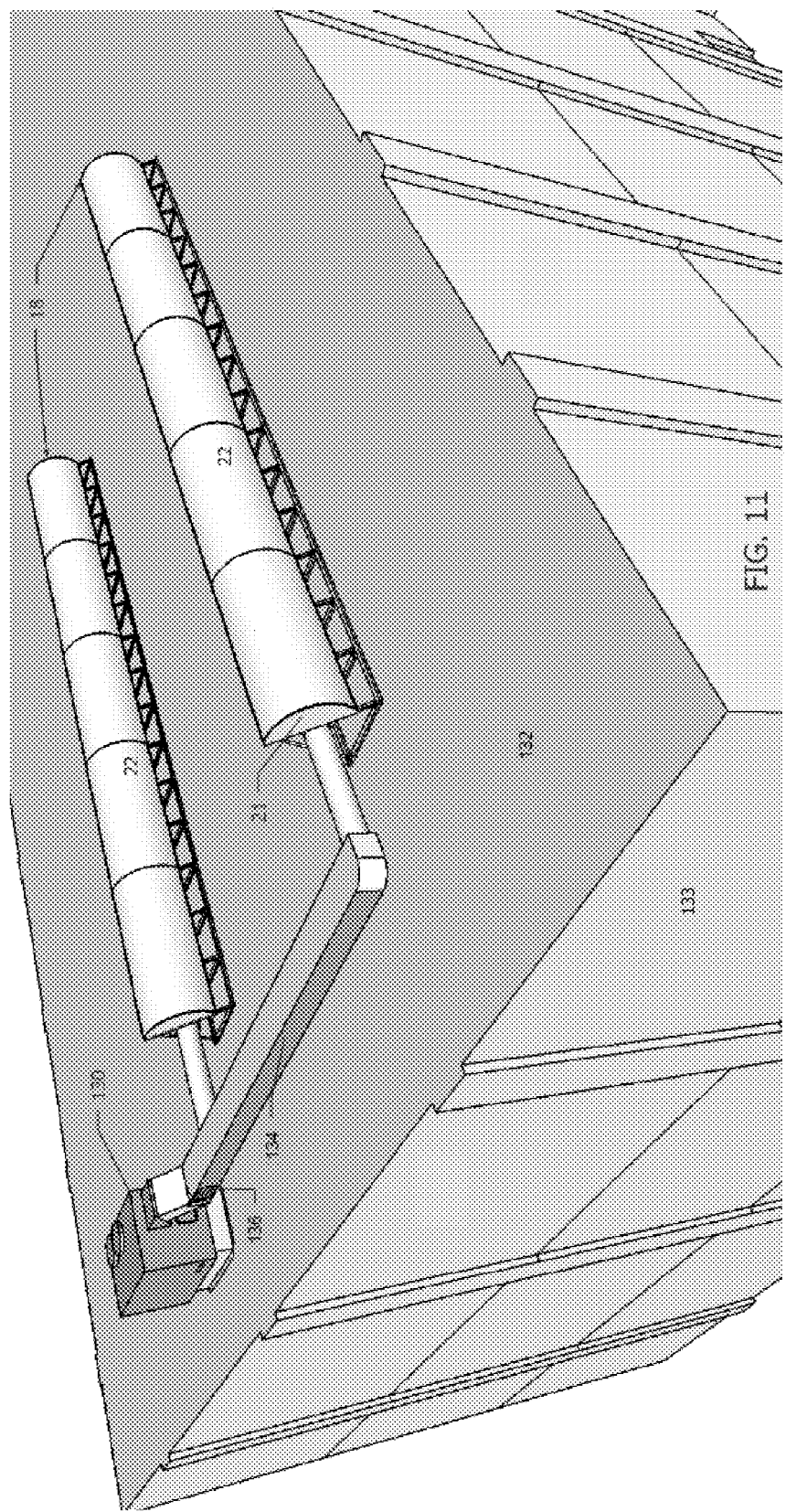

CURVED TRANSPIRED SOLAR AIR HEATER AND CONDUIT

RELATED APPLICATIONS AND PRIORITY

This patent application is a continuation of PCT application PCT/US2009/52158 filed Jul. 29, 2009, which claims the benefit of US provisional patent applications 61/084,286 filed Jul. 29, 2008, and 61/084,936 filed Jul. 30, 2008, both entitled "Curved Solar Air Heater/Conduit," and both of which are incorporated herein by reference.

FIELD

This patent application generally relates to air heating. More particularly it relates to solar air heaters. In one aspect it relates to solar heating systems that are integrated with building heating, ventilation, and/or air conditioning systems.

BACKGROUND

Solar air heating technology has been used for millennia, but it has only been applied relatively recently in systems which are integrated with building heating ventilation and air conditioning systems.

In one scheme solar air heating units were provided on south facing walls as wall claddings. In another, solar heating units were provided on rooftops of industrial or commercial buildings in close proximity to an air handler unit. These roof-mounted solar air heating units are typically installed in rows, and connected to a collector duct, which provides a conduit for the solar heated air to travel from the solar heating units to the air handler unit. However, these solar heating units have been expensive to acquire and install. They also have not been as efficient as possible in collecting solar energy.

Thus, better techniques for heating air with solar energy and for making and installing equipment for this purpose are needed, and these techniques are provided in this patent application.

SUMMARY

One aspect of the present patent application is an air heating system is for use with a mechanism for flowing air. The system includes a plenum and a solar absorber. The solar absorber defines a first boundary of the plenum. The solar absorber is permeable to air. The mechanism for flowing air is for pulling air into the plenum through the permeable solar absorber. The plenum has an axial direction, wherein along a cross section of said plenum normal to the axial direction the permeable absorber has an average shape that is substantially convex when the permeable absorber is viewed from outside of the plenum.

Another aspect of the present patent application is an air heating system for use on a support surface with a mechanism for flowing air. The system includes a plenum and a solar absorber. The solar absorber defines a first boundary of the plenum. The solar absorber includes a substantially vertical region and an inclined region. The solar absorber is permeable to air. The mechanism for flowing air is for pulling air into the plenum through the permeable solar absorber.

Another aspect of the present patent application is an air heating system for use with a mechanism for flowing air. The system includes a plenum, a solar absorber, and a reflector, wherein the solar absorber defines a first boundary of the plenum. The solar absorber includes an inclined light absorbing region. The solar absorber is permeable to air. The reflector is positioned to reflect sun light toward the solar absorber. The mechanism for flowing air is for pulling air into the plenum through the inclined permeable light absorbing region.

Another aspect of the present patent application is a method of fabricating an air heating system. The method includes providing an assembly including a backing wall and a solar absorber, wherein the solar absorber is substantially flat against the backing wall. Next, transporting the assembly of the solar absorber flat against the backing wall to a site for installation. At the site for installation mounting the solar absorber to the backing wall with a curved shape to provide a plenum there between.

Another aspect of the present patent application is a structure, comprising a plenum, a solar absorber, a mechanism for flowing air, and a facility for using air heated by the solar absorber. The solar absorber defines a first boundary of the plenum. The solar absorber has a curved light absorbing surface and is permeable to air. The mechanism for flowing air is connected to pull air into the plenum through the curved permeable solar absorber.

BRIEF DESCRIPTION OF THE DRAWINGS

The foregoing will be apparent from the following detailed description as illustrated in the accompanying drawings, for clarity not drawn to scale, in which:

FIGS. 1a, 1c are three dimensional views of one embodiment of a solar air heating system of the present patent application including a curved air permeable light absorber and conduit that absorbs solar radiation to heat air, allows the air to enter a plenum between the light absorbing surface and a backing wall for drawing along the axis of the plenum;

FIG. 1b is an enlarged view of one embodiment the curved air permeable light absorber of FIG. 1a showing the pores that allow outside air to enter the plenum;

FIG. 3 is a three dimensional close up view showing how absorber retaining brackets are used to facilitate providing the curve in the absorber;

FIG. 4a is a three dimensional view of the air permeable light absorber and conduit of FIGS. 2a, 2b along with the base, all in a flat position;

FIG. 4b is a three dimensional view of the air permeable light absorbing collector and conduit of FIG. 4a as partially assembled, with the air permeable light absorbing collector and conduit tilted at angle φ but the absorber still in a flat position just before being bent into its curved position;

FIG. 5 is a three dimensional view of another embodiment of a solar air heating system of the present patent application similar to that of FIG. 1 with a sun tracking sensor and actuator that control the tilt angle of the absorber;

FIG. 6a, 6b are three dimensional views of other embodiments of a solar air heating system of the present patent application similar to that of FIG. 1 with a single plane reflector or a compound reflector positioned to direct additional sunlight onto the absorber;

FIGS. 7a-7c are cross sectional views normal to an axis of the absorber showing how the reflectors of FIGS. 6a, 6b shine additional sunlight onto the absorber at each position as the sun moves across the sky;

FIG. 8a is a cross sectional view normal to an axis of the absorber showing how air penetrates radially through pores in the absorber into the plenum as the absorber is heated by solar radiation either directly or from a reflector;

FIG. 8b is a cross sectional view along the axis of the absorber of FIG. 8a showing how a thin membrane absorber is supported by ribs, how air penetrates through pores in the membrane absorber into the plenum as the membrane absorber is heated by solar radiation, and how that heated air is drawn along the plenum in the axial direction by a fan;

FIG. 10a is a cross sectional view normal to an axis of the plenum showing another embodiment of the solar collector of the present application with a convex permeable light absorbing surface for mounting at an incline, such as on an inclined roof;

FIG. 10b is a cross sectional view normal to an axis of the plenum showing another embodiment of the solar collector of the present application with a curved permeable light absorbing surface, with a duct extending through the backing wall for drawing heated air out of the plenum for use in a space or by a device that uses the heated air and with a reflector for shining light onto the absorber that would otherwise not strike the absorber; and FIG. 10c is a cross sectional view normal to an axis of the plenum showing an embodiment of the solar collector of the present application similar to that of FIG. 10 with a convex permeable light absorbing surface for mounting on a horizontal surface, such as a flat roof;

FIG. 11 is a three dimensional view showing an embodiment of the solar collector of the present application mounted on the roof of a building and connected to an air handling unit, in which the solar absorber has a curved permeable light absorbing surface, a duct extends from the solar collector to the air handler unit, and a reflector shines additional light onto the absorber that would otherwise not strike the absorber.

DETAILED DESCRIPTION

The present applicants found a way to make solar air heating more economical by providing a system design with components that are low-cost, easy to transport, and easy to work with in constrained spaces, such as rooftops, where heavy equipment access is very limited. The system is extremely easy to install, requiring little if any fine leveling or alignment. The system also substantially improves efficiency of collecting solar energy over that time because its design allows greater overall energy collection as the sun moves across the sky during the day and as its position changes through the course of the year.

Figure 1C:
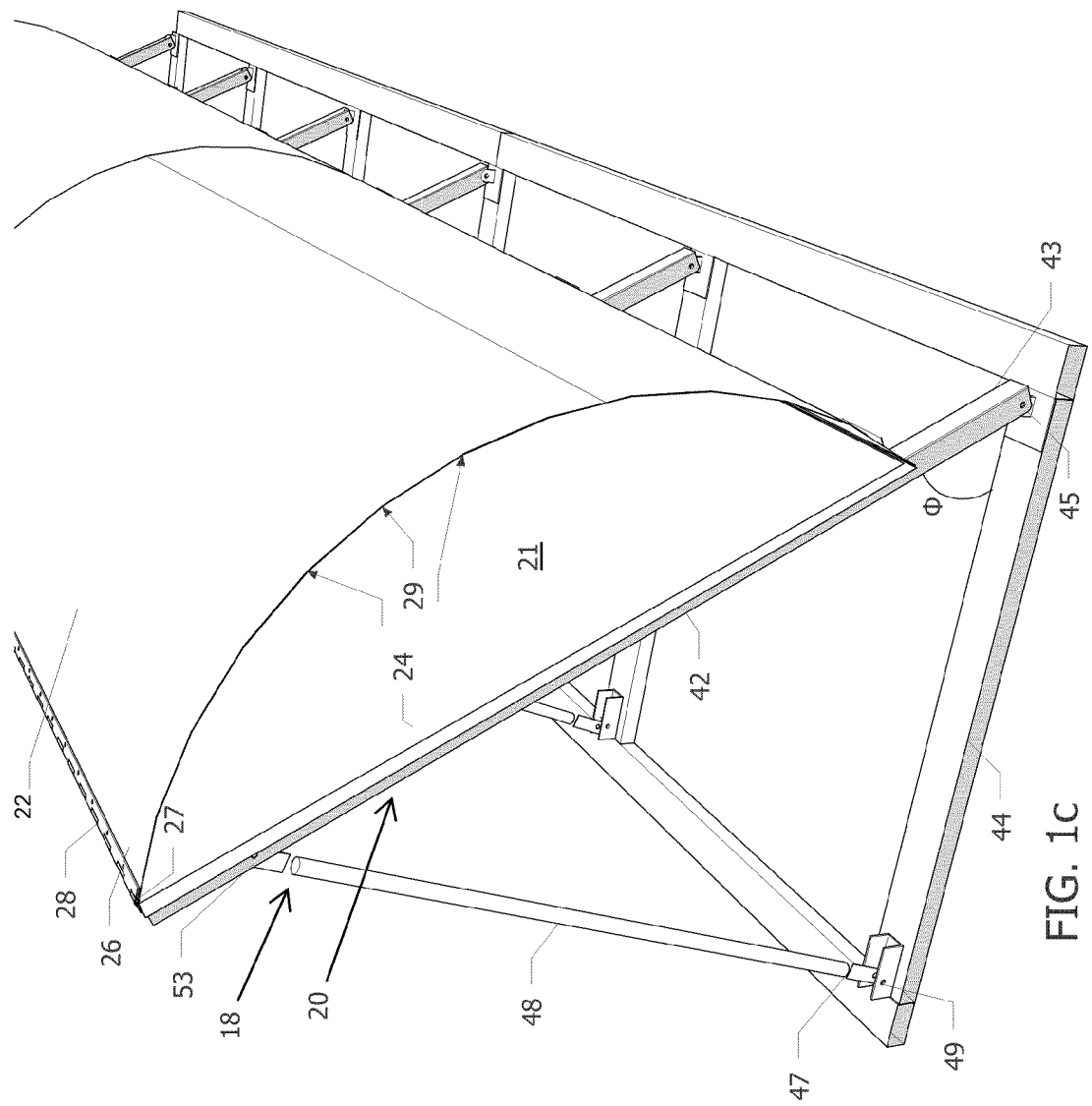

The present application provides solar air heating unit 18 that includes unglazed and transpired solar collector and conduit 20. Transpired solar collector and conduit 20 provides a first boundary to plenum 21. Transpired solar collector and conduit 20 gives passage to outside air to plenum 21 within, heats the air, and transports the air within plenum 21, as shown in FIGS. 1a, 1b, 1c, to a device or structure that uses the heated air, such as directly to living space or via an air handler to living space, or to a device such as a crop drier, clothes drier, and sludge drier. In one embodiment, collector and conduit 20 includes curved dark air permeable absorber 22 and air impermeable backing wall 24, as shown in FIGS. 1a, 1c.

Permeable absorber 22 is also known as a transpiration membrane since it gives passage to air through pores 25, as shown in FIG. 1b. Typically, porosity is in the range from 0.50% to 2.0%. Higher or lower porosity can also be used. For example, porosity can range up to about 6%. In one embodiment pores 25 were 1/16 inch (1.6 mm) holes on 9/16 inch (14 mm) centers in a square pattern. Hole sizes typically range between 1/16 (1.6 mm) inch to ½ inch (13 mm). Absorber 22 can also be perforated with slots. In one embodiment, punched loops can be used, as typically provided in soffits, that includes a dimple in the sheet material with a slitted hole on a side of the dimple.

Impermeable backing wall 24 has a smooth inner surface to facilitate flow of air within collector and conduit 20, and provides insulation to retain heat within plenum 21. In one embodiment impermeable backing wall 24 has a highly reflective inner surface to help retain heat as well.

Figure 2A:
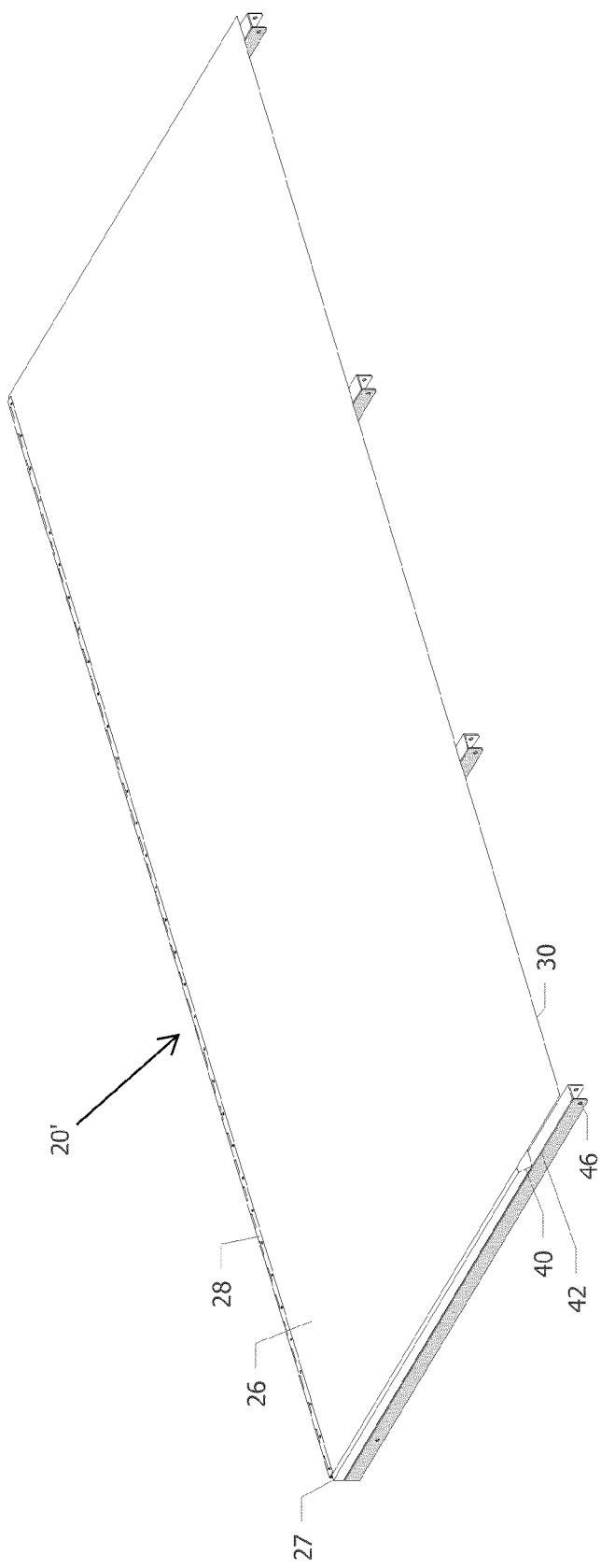
FIGS. 2a, 2b are three dimensional views of the air permeable light absorber and conduit in a flat position.
Figure 2B:
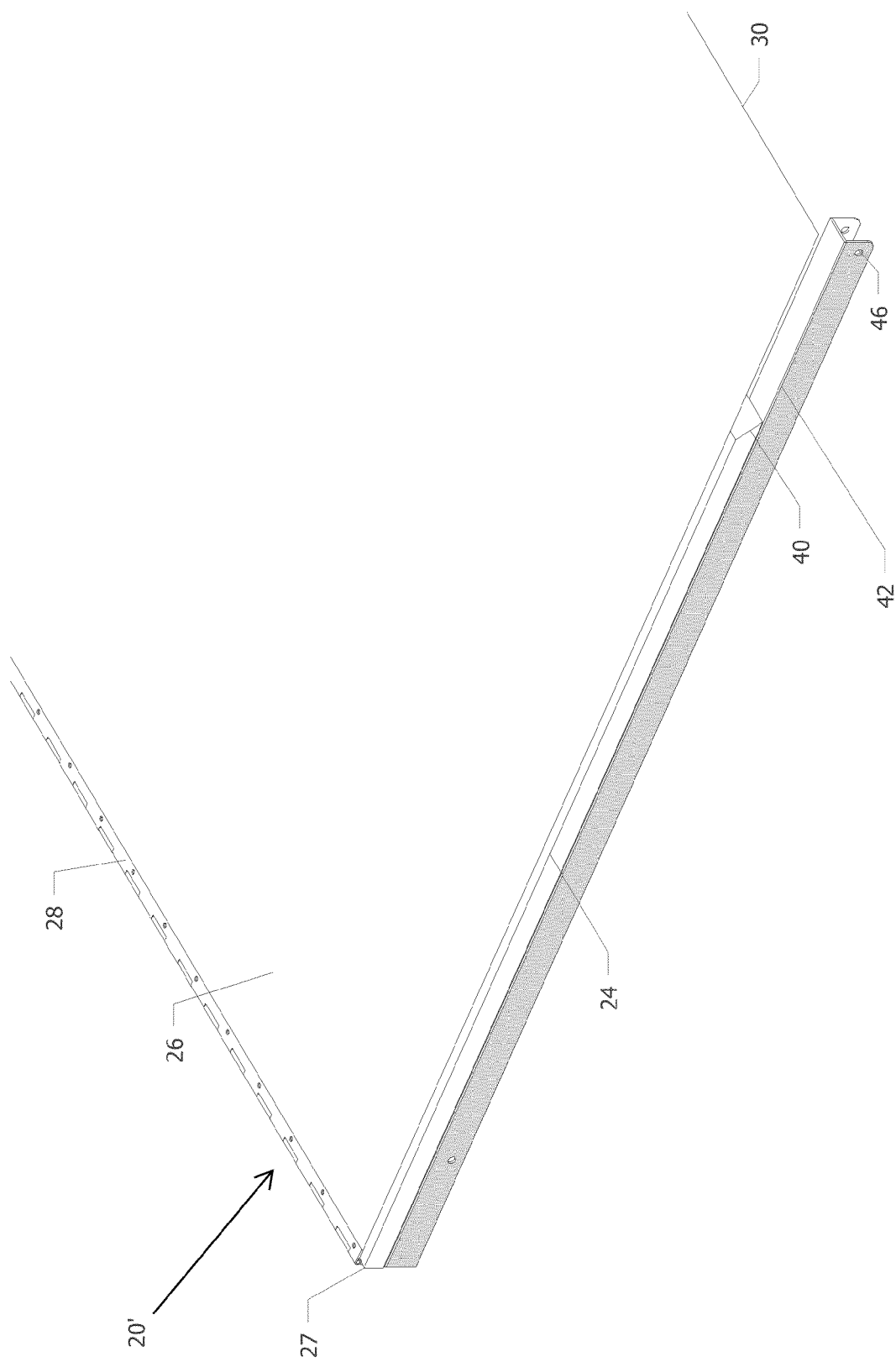

In one embodiment, curved dark air permeable absorber 22 is fabricated from a stiff material, such as perforated black flat sheet metal, as shown in FIGS. 2a, 2b. In one embodiment, pores 25 are formed by punching holes in the sheet metal. Top end 26 of absorber 22 is connected to top edge 27 of backing wall 24 with one or more fasteners, such as continuous hinge 28. The substantially convex curved shape 29 of absorber 22, as viewed from outside the plenum along a plane perpendicular to an axis of the plenum, is formed from flat perforated sheet absorber 22' shown in FIGS. 2a, 2b. The substantially convex solar absorber extends along the axial direction. Bottom end 30 of flat perforated sheet metal absorber 22' is pushed toward continuous hinge 28, causing absorber 22 to bend into curved shape 29, as shown in FIGS. 1a, 1b. In one embodiment, backing wall 24 remains substantially planar facing curved dark air permeable absorber 22, as shown in FIG. 1c. In one embodiment, distance between solar absorber 22 and backing wall 24 defines a plenum depth. Plenum 21 has a maximum depth of plenum, and the plenum depth is a substantial part of the maximum depth of plenum under most of solar absorber 22, as shown in FIGS. 1a, 1c, and 8a. The maximum plenum depth is substantially constant along the axial direction. In one embodiment, plenum depth is sufficient under most of the solar absorber so the mechanism for flowing air, such as a fan or an air handling unit, primarily pulls air entering plenum 21 through most of solar absorber 22 in the axial direction, as shown in FIGS. 1c, 8b, and 11. The plenum is substantially free of obstruction to air flow along the axial direction. In one trial backing wall 24 was 49.5 inches (126 cm) wide and absorber 22 was bent to provide a maximum depth of plenum 21 at 17.5 inches (44 cm). In another trial a shorter absorber 22 was used, and the maximum depth of plenum 21 was 11 inches (28 cm) and in another the maximum depth was 10 inches (25 cm). In an alternative embodiment, the hinges are installed along bottom end of absorber 22. Absorber 22 is pushed from the top end to form curved shape 29 and connected to top edge of backing wall 24. With substantially convex curved shape 29 the cross section perpendicular to the axial direction has substantial area between absorber 22 and planar backing surface 24. Adjacent top end 26 and bottom end 30, perforated sheet metal absorber 22, 22' makes an acute angle with backing surface 24.

Convex air permeable absorber 22 has a generally half oval cross section with a width and a maximum depth, in which the width is substantially greater than said maximum depth, as shown in FIGS. 1a, 1c, 5, 6a, 6b, 7a-7c, and 8a. Convex air permeable absorber 22 has a top edge and a bottom edge in which area between the convex absorber and backing surface is substantially equal to area between the convex absorber and a planar surface extending across from top edge to bottom edge.

Bottom end 30 may be temporarily held with absorber retaining brackets 36 a gap there between to retain curved shape 29 while fasteners, such as screws or bolts 38, also a gap there between, are used to set bottom end 30 permanently in place with gasket seal 37 against bottom edge 40 of backing wall 24, as shown in FIGS. 2b and 3. Retaining brackets 36 can be left in place after fasteners are installed. The amount of curvature of absorber 22 is determined by the distance bottom end 30 is pushed toward continuous hinge 28 before it reaches bottom edge 40 of backing wall 24. Thus, the width dimension of backing wall 24 determines the curvature of absorber 22. The perforated black flat sheet metal can be fabricated of a sheet metal such as steel or aluminum. The sheet metal typically has a thickness in the range from 0.25 mm to 1 mm. It can also have a thickness greater than 1 mm. In one embodiment enamel painted 26-gauge 10-20 steel can be used with a thickness of 18 mils or 0.45 mm. Alternatively, a material such as perforated plastic can be used. For example, polyethylene plate can be used. The sheet or plate material can be corrugated for improved rigidity. Instead of black other dark colored surface finishes can be used. Typically the absorber has an absorptivity greater than 80% and preferably equal to or greater than 95%. Between curved absorber 22 and backing wall 24 air plenum 21 is formed through which collected heated air is drawn for use.

In one embodiment, backing wall 24 is mounted on collector legs 42, as shown in FIGS. 1b, 2a, 2b with fasteners (not shown). Bottom ends 43 of collector legs 42 are connected to base 44 with pins or hinges 45 that extend through clearance holes 46, as shown in FIGS. 1a, 1b and in FIGS. 4a, 4b, so collector legs 42 may be easily elevated from the flat position against base 44 shown in FIG. 4a to the tilted position at angle φ shown in FIGS. 1a, 1b and FIG. 4b. Bottom ends 47 of support legs 48 are connected to base 44 with pins or hinges 49 and are raised to support collector legs 42 at the desired tilt angle φ Top ends of support legs 48 are connected to collector legs 42 with pins or hinges 53. Base 44 may be mounted to a support surface, such as the roof of a building or the ground.

In one embodiment, locking leg 52 is used, as shown in FIG. 4b. In one embodiment locking leg 52 has pin hinge 45 connecting it to base 44. Locking leg also has pin hinge 53 where it contacts collector leg 42. Locking leg 52 also has two leg segments, 52a, 52b with hinge 54 there between. When collector 20 is elevated and locking leg 52 is fully extended, a leg locking device locks hinge 54 so leg segments 52a and 52b extend in a straight line in a fixed position. In one embodiment support legs 48 and one of the locking leg segments 52a or 52b have telescoping sections so angle φ can be adjusted seasonally to improve collector orientation. Locking leg 52 allows the absorber 20 or 20' to be easily elevated from the flat position against base 44 shown in FIG. 4a to the tilted position at angle Φ shown in FIGS. 2a, 2b and FIG. 4b. Once in this position the locking leg 52 is locked into place with a leg locking device (not shown).

In each embodiment support legs 48, 52 are dimensioned to optimize the average light incidence angle θ with respect to the absorber for the latitude of the installation.

In another embodiment, tilt angle φ is controlled by single horizontal axis actuator 56. In one embodiment, actuator 56 is a telescoping cylinder controlled by solar tracking controller 58, as shown in FIG. 5. In one embodiment solar tracking controller 58 includes a pair of photocells at 90 degrees to each other, both of which are normal to the axis of rotation. Solar tracking controller 58 is rigidly attached to a moving portion of collector 20, as shown in FIG. 5. Controller 58 receives electrical output of the two photocells and sends a signal along wire 59 to actuator 56 that includes motor 60 that turns a screw that determines tilt angle φ to optimize solar absorption by collector 20. Actuator 56 can be a linear actuator, such as model LA 12, available from Linak Company, Louisville, Ky. http://www.techline.linak.com/Products/id2=120. Solar tracking controller 58 can be fusionseeker solar tracker controller, available from Technological Centre of Research and Experimental Development in the field of Energy Conversion, Maribor, Slovenia http://www.fusionseeker.com/. Thus, angle φ of collector and conduit 20 may be automatically adjusted in one axis to follow the sun to optimize collection of solar energy through the day and through the year. In another embodiment, the sun's position at the location is computed based on date, absolute time, and latitude, and angle φ of collector and conduit 20 is automatically adjusted to follow the calculated position of the sun. In yet another embodiment, a combination of these techniques is used.

Figure 6A:
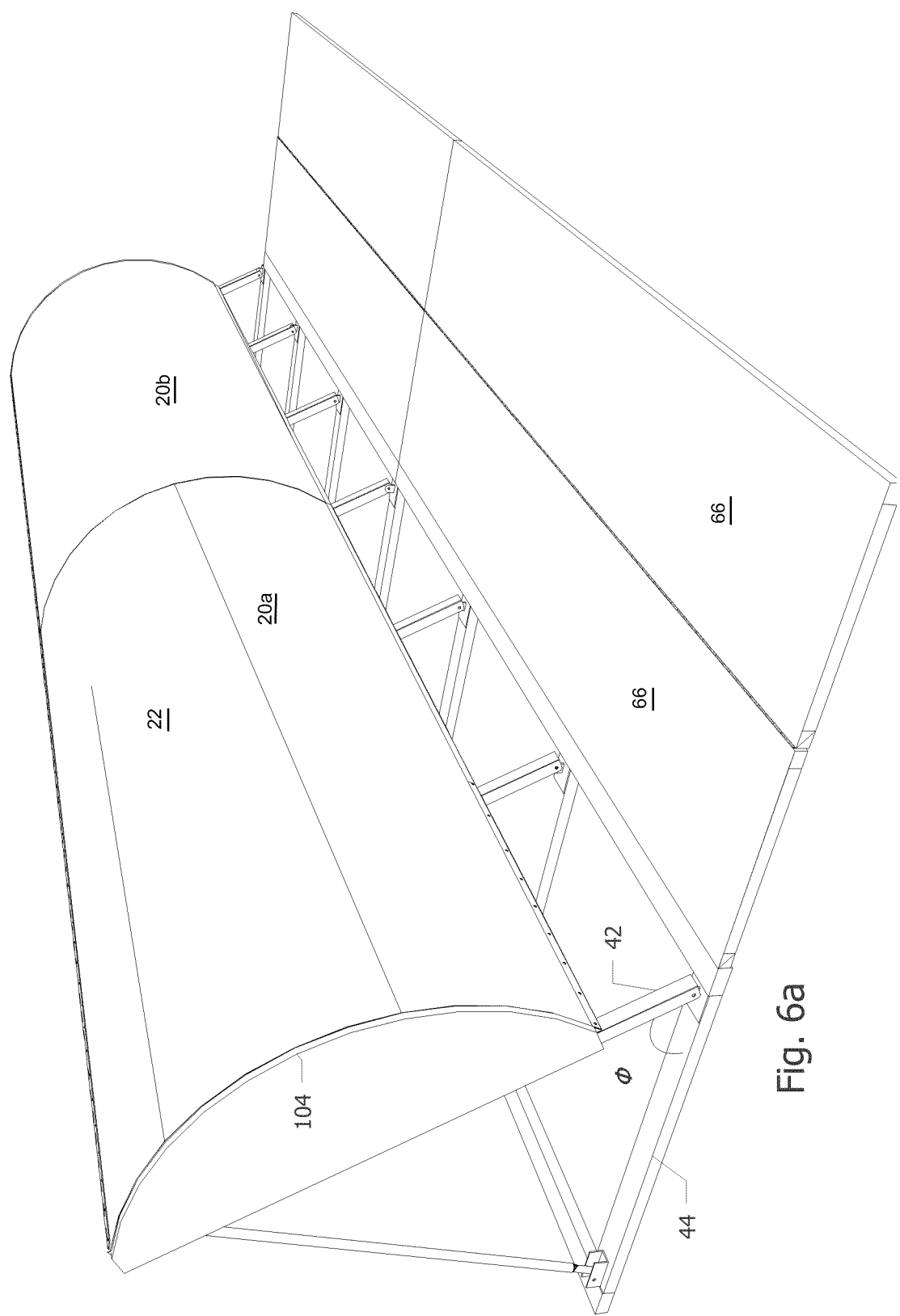
Figure 7A:
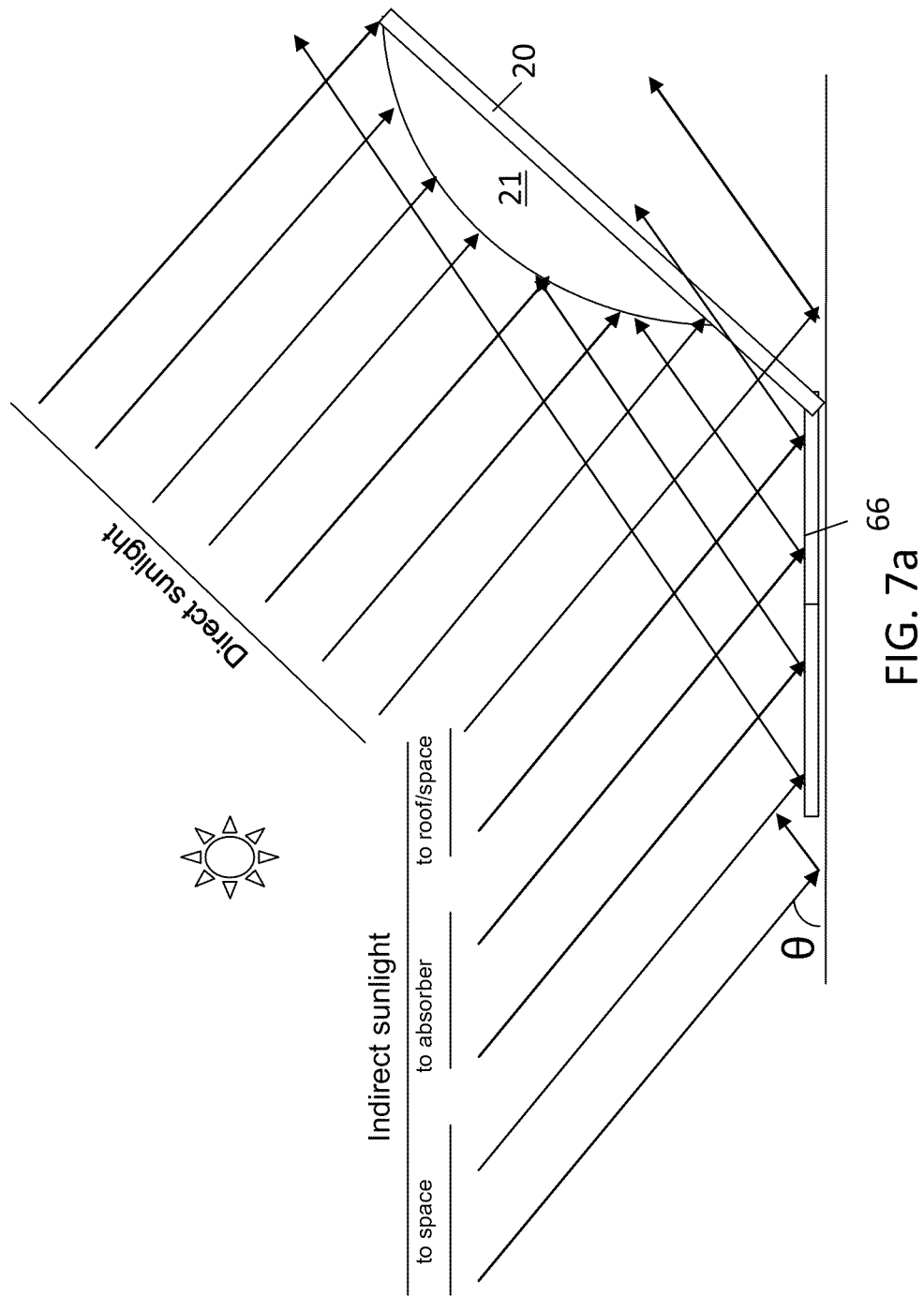
Figure 7B:
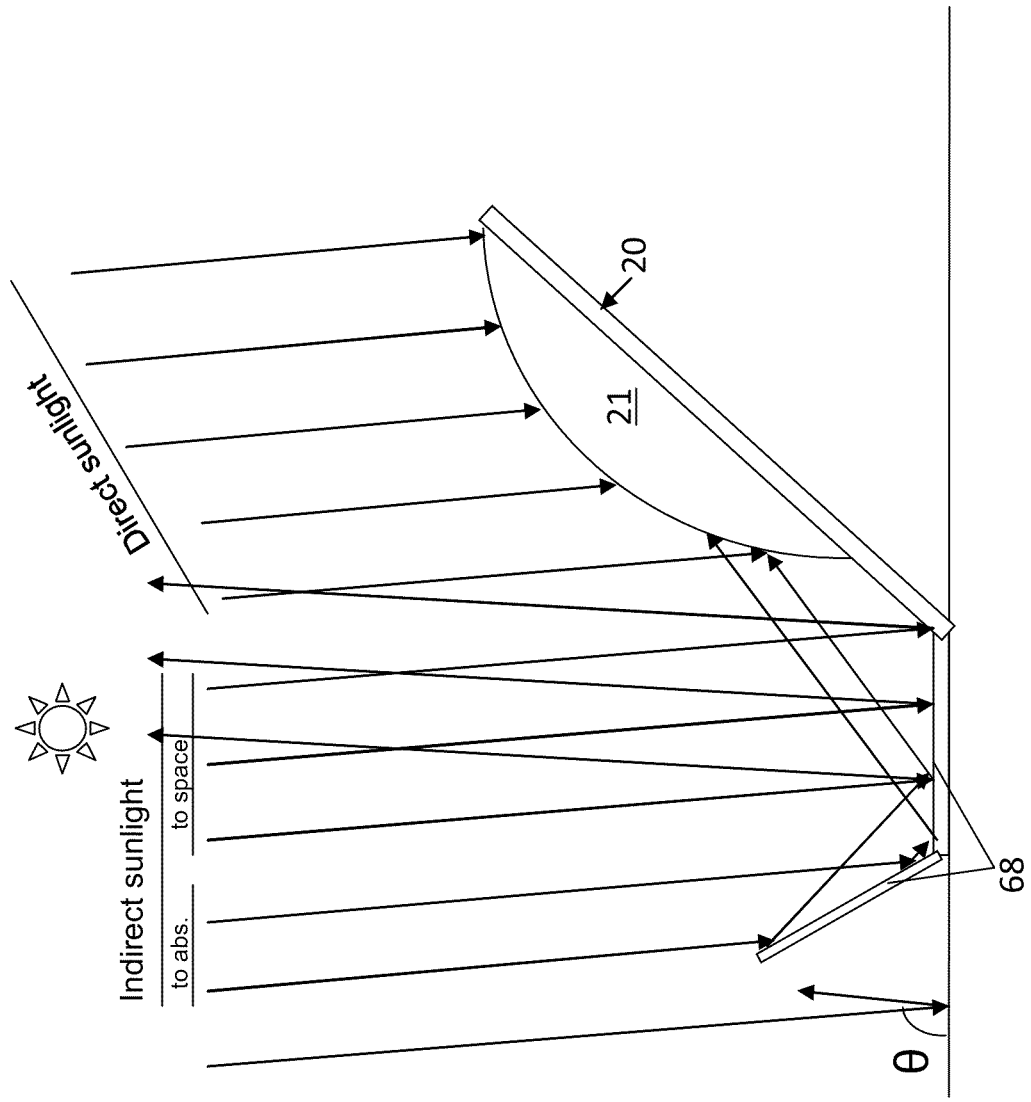

In another embodiment, reflector 66 may be included, as shown in FIG. 6a. Additional reflectors, such as reflector 66b may also be included to provide compound reflector 68, as shown in FIGS. 6a and 6b. Reflector 66, 66b may be flat or curved. Reflector 66, 66b can be made of a material, such as aluminum that is highly reflective. It can also be made of a reflective polymer and/or have a highly reflective surface coating, such as aluminized paint, high gloss white paint, or any other highly reflective or mirror surface. Reflector 66, 66b is positioned on the sunny side of absorber and conduit 20 to allow sunlight that does not directly strike curved absorber 22 to be reflected onto curved absorber 22, thus, increasing the effective area of absorber and conduit 20 and its effective energy efficiency. Reflector 66, 66b increases light absorption at each position of the sun as the sun moves across the sky, as shown in FIGS. 7a-7c, without substantially increasing materials or installation cost.

In one embodiment, both absorber 20 and reflector 66 are in a fixed position. In another embodiment, absorber 20 moves according to solar tracker controller 58 and actuator 56 while reflector 66, 68 is in fixed position. In another embodiment, absorber 20 is in fixed position and reflector 66,68 moves according to a solar tracker controller 58 and its own actuator. In yet another embodiment, solar tracker controller 58 provides distinct output signals to separate actuators in both absorber 20 and reflector 66, 68 to adjust their angles to optimize absorption of light in absorber 20 as the sun changes its position.

In all of the embodiments, solar absorber and conduit 20 may be transported to the rooftop or other use location in the substantially flat position shown in FIG. 4a. Hinge 28 and flexible absorber 22 allow solar absorber and conduit 20 to then be easily assembled from that substantially flat position to provide its curved shape and elevated angle φ of FIG. 4b. Thus, solar absorber and conduit 20 may have corrugations or other irregularities and still be transported in a substantially flat position. Thus, the average shape of the absorber is flat during transportation, even with corrugations.

In another embodiment, support ribs 76 may be included to hold a more flexible membrane 78 in its curved position and to hold flexible membrane 78 to backing surface 22, as shown in FIG. 8a. Support ribs 76 may be connected to backing surface 22 and to top end 80 and bottom end 82 of flexible membrane 78. Support ribs 76 support flexible membrane 78 at intervals along axial direction 90 of absorber and conduit 92.

With support ribs 76, flexible membrane 78 can be substantially thinner than the material of the embodiment of FIGS. 1a, 1b. Air permeable light absorbing flexible membrane 78 can be made of a material, such as a perforated metal, a metal mesh, a woven fabric, a non-woven fabric, a perforated film, and a porous film. The films can be made of a polymer, such as plastic that is only a few mils thick.

Connection between support ribs 76 and flexible membrane 78 may be continuous or it may be formed with a plurality of fasteners holding support ribs 76 to backing wall 24 and to flexible membrane 78. Membrane 78 can also be stretched over ribs 76 and held against them only by tension in membrane 78 that is applied both in circumferential and longitudinal directions. When the absorber and conduit 92 is assembled, flexible membrane 78, backing wall 24, and ribs 76 are solidly tied into one another and form a rigid and durable structure.

The physical arrangement of membrane 78 and backing wall 24 is such that air plenum 21 is created between membrane 78 and backing wall 24.

Figure 9B:
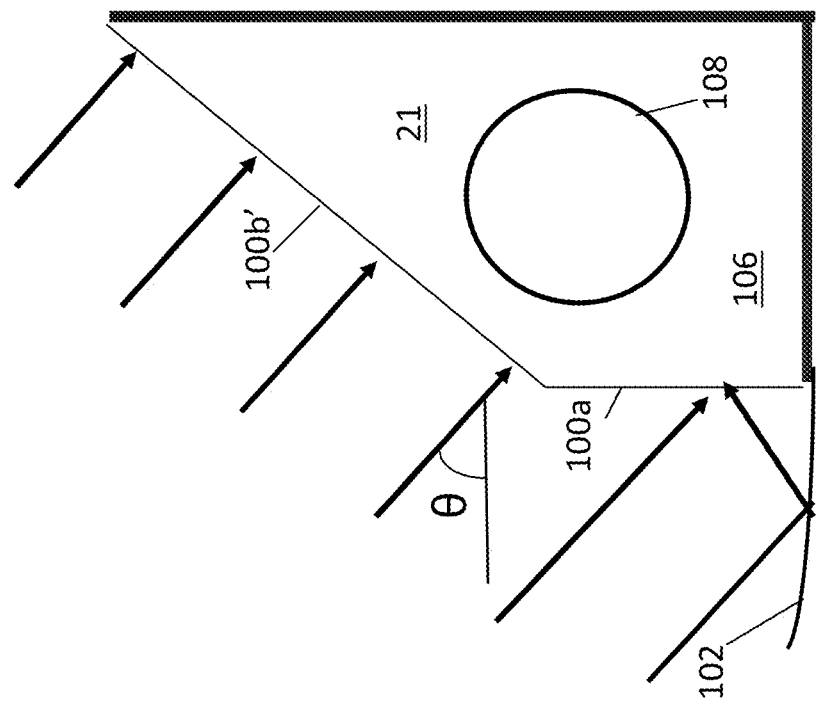
FIG. 9b is a cross sectional view normal to an axis of the plenum showing another embodiment of the solar collector of the present application with both a flat inclined permeable light absorbing surface and a flat vertical permeable light absorbing surface, with a rigid end cap with a hole allowing heated air to pass through, and with a reflector for shining light onto the absorber that would otherwise not strike the absorber.
Figure 9A:
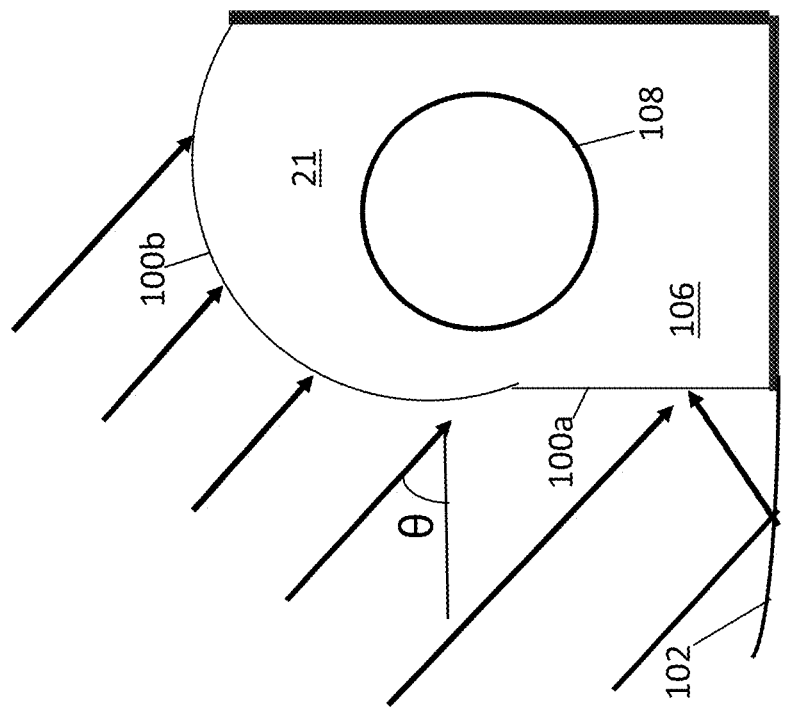
FIG. 9a is a cross sectional view normal to an axis of the plenum showing another embodiment of the solar collector of the present application with both a curved permeable light absorbing surface and a flat vertical permeable light absorbing surface, with a rigid end cap with a hole allowing heated air to pass through, and with a reflector for shining light onto the absorber that would otherwise not strike the absorber.

In one embodiment, curved permeable light absorber 22 or light absorbing membrane 78 is convex, as shown in FIGS. 1a, 1b and in FIGS. 8a, 8b as viewed from outside plenum 21. In another embodiment, light absorber 22 or light absorbing membrane 78 includes two distinct absorber membrane sections 100a, 100b, as shown in FIG. 9a, with section 100a being a vertical flat section, and with section 100b having a gradually changing incline, such as a curved section. Section 100b' can also be an inclined planar section, as shown in FIG. 9b. Section 100b can also be a corrugated as shown in FIG. 9c or any other profiled surfaces shape. Corrugation can improve structural rigidity. The average shape of the absorber is convex, as shown by the dotted line in FIG. 9c. In this embodiment reflector 102 may be included, providing substantially more sunlight to be absorbed by vertical section 100a than directly strikes vertical section 100a.

Figure 9D:
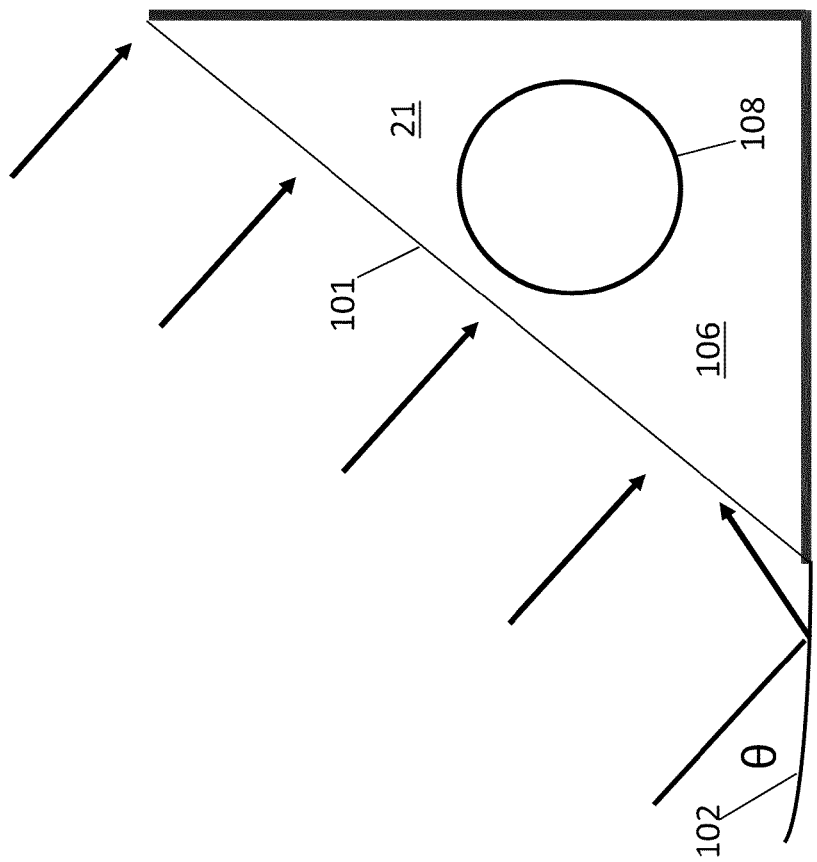
FIG. 9d is a cross sectional view normal to an axis of the plenum showing another embodiment of the solar collector of the present application with a flat inclined permeable light absorbing surface and a reflector for directing additional sunlight onto the flat inclined permeable light absorbing surface.
Figure 9C:
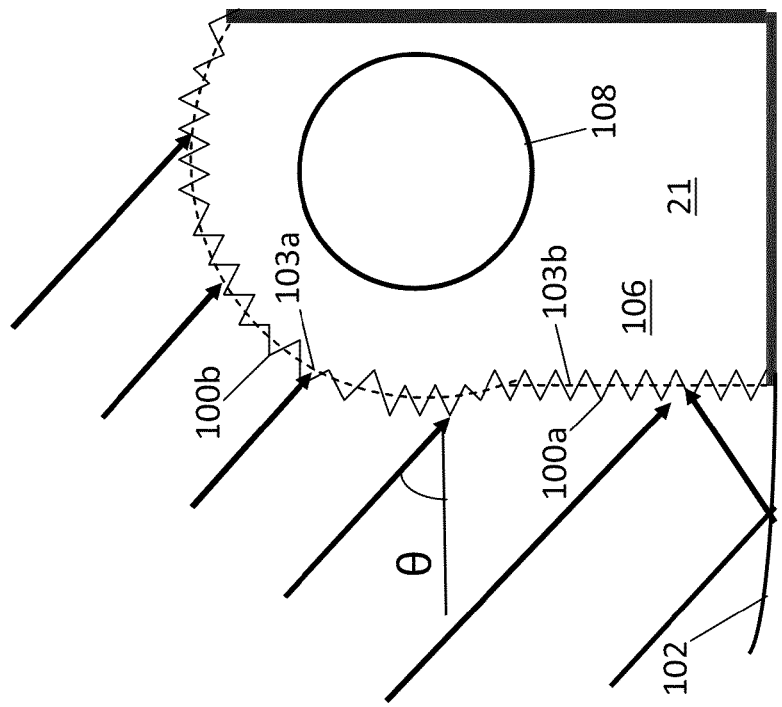
FIG. 9c is a cross sectional view normal to an axis of the plenum showing another embodiment of the solar collector of the present application with both a curved permeable light absorbing average surface and a flat vertical permeable light absorbing average surface, with a rigid end cap with a hole allowing heated air to pass through, with a reflector for shining light onto the absorber that would otherwise not strike the absorber, and in which the absorbing surfaces include corrugations that extend above and below the average surface.

Another embodiment combines reflector 102 with single inclined absorber or membrane 105, as shown in FIG. 9d. Inclined absorber membrane 105 may be planar, corrugated or have a curved surface.

In each of these embodiments reflector 102 can have a surface coating of a material, such as aluminum paint or other paint that is highly reflective. It can also be made of a reflective polymer. The reflector effectively increases the area of collection of solar radiation while adding minimal material cost. Reflector 102 can be a single reflector or a compound reflector. The compound reflector can include multiple flat segments. It can also be formed in a curved shape such as parabolic or circular.

With each of the embodiments described herein above, absorber and conduit 20, 92 is used with a mechanism for flowing air, such as a fan (not shown). The fan can be included in a device, such as an air handler unit. When the solar heating unit is in operation, air which has been heated by the sun at the surface of the absorber membrane passes through curved permeable membrane 22, 78 and enters into air plenum 21 in a radial direction as shown by wavy arrows in FIG. 8a. This heated air is then transported down the length of air plenum 21 in the axial direction towards outlet 96 and toward a system for using or distributing the heated air downstream of absorber and conduit 20, 92.

Two or more absorber and conduits 20a, 20b, 92 may be connected together to form a longer row, as shown in FIGS. 1a, 6a, 6b. The two or more absorber and conduit units are connected so the solar absorbers are aligned, the backing walls are aligned, and the plenums are aligned so air entering a plenum of one of the connected absorber and conduit units passes in the axial direction through a plenum of a second of the connected absorber and conduit units. Row end cap 104 may be used at the end of a single absorber and conduit 20a, 92 or at the end of a row of absorbers and conduits 20a, 20b, 92 to retain heated air within air plenum 21, prevent cooler outside air from getting in through other than through light absorber 22 or membrane 78, and provide stiffness to membrane 78 in the axial direction. Row end cap 104 can be a plate that completely covers this end of absorber 22 or membrane 78. This plate can be fabricated of an impermeable material, such as metal, wood, or plastic and can be insulated with foam insulation, air gap, and reflective inner surface to prevent heat loss. In one embodiment the plate is thick enough to both provide structural support and block flow of air into the duct from this end, so air only comes in to air plenum 21 through absorber 22 or membrane 78, where the air has been heated by the sun. Both ends can have this row end cap 104 if air is removed from an intermediate portion of the row through backing wall 24.

In one design for a row of absorbers 20, rigid end cap 106 with hole 108 allowing heated air to pass through can be used at the end of each row of absorbers 20 that is connected to the mechanism for flowing air. Thus, both structural support and air flow can be provided at this end. One or both end caps 104, 106 can be held in place with tensioner cables (not shown) to provide support in the axial direction.

In another embodiment, solar absorber and conduit 120 is directly mounted on a support surface such as angled roof 122, as shown in FIG. 10a, thus eliminating the need for legs and hinges. Angled roof 122 can also take the place of backing wall 24 providing the impermeable insulated backing surface. In this embodiment, angled roof 122 defines a boundary of plenum 21 along with solar absorber and conduit 120. The solar absorber and conduit 120 of FIG. 10a can also be directly mounted to a horizontal surface, such as a flat roof or the ground, as shown in FIG. 10c. An insulated backing surface can be used if the support surface to which solar absorber and conduit 120 is mounted does not permit adequate sealing of plenum 21 and insulation or does not have a sufficiently smooth surface for laminar or low turbulence air flow in plenum 21.

In one embodiment an air outlet box 124 is connected to a penetration through impermeable backing wall 24 for the air outlet from plenum 21, as shown in FIG. 10b. In another embodiment an air outlet box is connected to hole 108 in rigid end cap 106 at the end of solar air heating unit 18 or at the end of a row of connected solar air heating units 18. Air outlet box 124 can have any shape, such as circular or rectangular.

One or more rows of solar absorber and conduit units 20, 92 can be installed for preheating fresh air immediately upstream of air handler unit 130, all mounted on roof 132 of building 133, as shown in FIG. 11. Air handler units 130, such as "Solution" packaged air handlers or "Commercial Comfort Systems" (CCS) Series 5, Series 10, Series 20, Series 40, Series 100 manufactured by Johnson Controls, Milwaukee, Wis., are installed on most institutional, commercial and industrial buildings as well as multi-unit residential buildings. During the heating season, natural gas (or another source of heat) is generally used within air handling systems to preheat the incoming air in order to maintain acceptable comfort levels within these buildings. The use of rows of solar air heating units 18 provides solar preheating. Air is carried from rows of solar air heating units 18 to air handler unit 130 through transfer duct system 134. Curved solar absorber and conduit 20 will typically reduce the consumption of natural gas to preheat incoming air by 25-90%. The amount of natural gas displacement potential is generally a function of climate variables such as insolation (amount of solar radiation available), daytime and nighttime ambient temperature variations, and building demand.

Bypass louvers 136 are generally supplied in the transfer duct system 134 so that air entering air handler unit 130 can be drawn directly into building 133 without passing through and being heated in solar collectors 20 in the warm season when building 133 does not require space heating.

In addition to heating air for direct space heating and for further heating in an air handling unit, solar air heating unit 18 with its curved absorber 22 can also be installed for preheating process air that is further heated in an industrial application, such as for preheating air for use in an industrial oven. Solar air heating unit 18 with its curved absorber 22 can also be installed for direct application of the heated air for an application, such as crop drying. The heated air from solar air heating unit 18 can also be provided to another heating process so solar air heating unit serves as a preheater. It can also be installed to provide warmed boiler combustion air.

While the disclosed methods and systems have been shown and described in connection with illustrated embodiments, various changes may be made therein without departing from the spirit and scope of the invention as defined in the appended claims.

The invention claimed is:

1. An air heating system for use with a mechanism for flowing air, comprising a solar absorber, a backing wall, a first element, and a second element, wherein said solar absorber has a solar absorber first end and a solar absorber second end, wherein said solar absorber has a rigidity sufficient to provide and maintain an average shape that is convex when said solar absorber first end is connected to said backing wall, a force to bend said solar absorber into said convex shape is applied, and said solar absorber second end is connected to said backing wall, wherein said first element and said second element have a gap there between and are configured for holding said solar absorber second end so said solar absorber has said convex shape when said solar absorber is viewed from outside of said solar absorber, wherein said convex shape provides a plenum for air flow, wherein said plenum extends in an axial direction between said solar absorber and said backing wall, wherein said solar absorber is dark colored and permeable to air, wherein when the mechanism for flowing air is connected to said plenum air is pulled into said plenum through said dark colored permeable solar absorber, wherein distance between said solar absorber and said backing wall defines a plenum depth, wherein said plenum depth is sufficient under most of said solar absorber so air entering said plenum through most of said solar absorber is pulled primarily in said axial direction.

2. An air heating system for use with a mechanism for flowing air, comprising a plurality of connectable absorber and conduit units, wherein each said absorber and conduit unit includes a solar absorber, a backing wall, a first element, and a second element, wherein said solar absorber has a solar absorber first end and a solar absorber second end, wherein said solar absorber has a rigidity sufficient to provide and maintain an average shape that is convex when said solar absorber first end is connected to said backing wall, a force to bend said solar absorber into said convex shape is applied, and said solar absorber second end is connected to said backing wall, wherein said first element and said second element have a gap there between and are configured for holding said solar absorber second end so said solar absorber has said convex shape when said solar absorber is viewed from outside of said solar absorber, wherein said convex shape provides a plenum for air flow, wherein said plenum extends in an axial direction between said solar absorber and said backing wall, wherein said solar absorber is dark colored and permeable to air, wherein when the mechanism for flowing air is connected to said plenum, air is pulled into said plenum through said dark colored permeable solar absorber, wherein distance between said solar absorber and said backing wall defines a plenum depth, wherein said plenum depth is sufficient under most of said solar absorber so air entering said plenum through most of said solar absorber is pulled primarily in said axial direction, wherein when said plurality of absorber and conduit units are connected, said plurality of solar absorbers are aligned, said plurality of backing walls are aligned, and said plurality of plenums are aligned so air entering a plenum of a first of said plurality of connected absorber and conduit units passes in said axial direction through a plenum of a second of said plurality of connected absorber and conduit units.

3. An air heating system as recited in claim 2, wherein said solar absorber has a width between said solar absorber first end and said solar absorber second end defined when said permeable solar absorber is lying flat, wherein said solar absorber has a rigidity sufficient to provide and maintain its convex light absorbing surface shape when supported only along said solar absorber first and second ends, wherein said distance between said solar absorber first and second ends is less than said width when lying flat.

4. An air heating system as recited in claim 3, wherein said solar absorber includes sheet material having a thickness in the range from 0.25 mm to 1 mm.

5. An air heating system as recited in claim 2, wherein said solar absorber includes corrugation, wherein an average surface of said corrugated solar absorber has a convex shape when said solar absorber is viewed from outside of said plenum normal to said axial direction, wherein said average surface of said corrugated solar absorber is a surface drawn to represent an average of said corrugation.

6. An air heating system as recited in claim 2, wherein said solar absorber is mounted to said backing wall.

7. An air heating system as recited in claim 6, wherein said backing wall includes an insulator.

8. An air heating system as recited in claim 7, wherein said backing wall is impermeable to air.

9. An air heating system as recited in claim 8, further comprising a support leg, wherein said backing wall is supported at an angle by said support leg.

10. An air heating system as recited in claim 6, further comprising a structure having a support surface, wherein said support surface has an orientation, wherein said backing wall is mounted to said support surface at said orientation.

11. An air heating system as recited in claim 10, wherein said orientation is horizontal.

12. An air heating system as recited in claim 10, wherein said orientation is tilted.

13. An air heating system as recited in claim 2, further comprising ribs for supporting said solar absorber.

14. An air heating system as recited in claim 13, wherein said solar absorber is mounted to said backing wall, wherein said ribs extend to said backing wall.

15. An air heating system as recited in claim 2, further comprising a structure having a support surface, wherein said support surface has an orientation, wherein said solar absorber is mounted to said support surface at said orientation, wherein said support surface includes said backing wall of said plenum.

16. An air heating system as recited in claim 15, wherein said orientation is horizontal.

17. An air heating system as recited in claim 15, wherein said orientation is tilted.

18. An air heating system as recited in claim 2, wherein said dark color is black.

19. An air heating system as recited in claim 2, wherein said solar absorber includes at least one from the group consisting of a perforated metal, a metal mesh, a woven fabric, a non-woven fabric, a perforated film, and a porous film.

20. An air heating system as recited in claim 19, wherein said perforated film includes a polymer material.

21. An air heating system as recited in claim 2, wherein said plenum has a maximum plenum depth, wherein said maximum plenum depth is substantially constant along said axial direction, wherein said plenum depth is a substantial part of said maximum plenum depth under most of said solar absorber.

22. An air heating system as recited in claim 21, wherein said maximum plenum depth is 10 inches or more.

23. An air heating system as recited in claim 2, further comprising said mechanism for flowing air and a facility, wherein said mechanism for flowing air includes an air handler unit and wherein said facility includes a building.

24. An air heating system as recited in claim 23, wherein said facility provides a process that uses heated air.

25. An air heating system as recited in claim 24, wherein said facility provides a process for drying.

26. An air heating system as recited in claim 25, wherein said drying process includes one from the group comprising crop drying, sludge drying, paint drying, and clothes drying.

27. An air heating system as recited in claim 23, wherein said building uses said heated air for space heating.

28. An air heating system as recited in claim 2, wherein said backing wall includes a substantially planar portion facing said solar absorber.

29. An air heating system as recited in claim 2, wherein said convex solar absorber has a generally half oval shape, wherein said convex solar absorber has a width and a maximum depth, wherein said width is substantially greater than said maximum depth.

30. An air heating system as recited in claim 2, wherein along a cross section of said solar absorber normal to said axial direction area between said convex solar absorber and said backing surface is substantially equal to area between said convex solar absorber and a planar surface extending across from said solar absorber first end to said solar absorber second end.

31. An air heating system as recited in claim 2, wherein said solar absorber is unglazed.

32. An air heating system as recited in claim 2, wherein said solar absorber extends toward said backing wall at a first angle to said backing wall adjacent said solar absorber first end, wherein said first angle is acute.

33. An air heating system as recited in claim 2, wherein said first element and said second element include at least one from the group consisting of a plurality of retaining brackets with said gap there between and fasteners with said gap there between.

34. A method of fabricating an air heating system for use with a mechanism for flowing air, comprising in order:
  a. providing an assembly including a plurality of connectable absorber and conduit units, wherein each said absorber and conduit unit includes a first element, a second element, a backing wall, and a solar absorber, wherein said solar absorber is substantially flat against said backing wall, wherein said solar absorber is dark colored and permeable to air, wherein said solar absorber has a solar absorber first end and a solar absorber second end, wherein said solar absorber has a rigidity sufficient to provide and maintain an average shape that is convex when supported only along said solar absorber first and second ends;
  b. transporting said assembly to a site for installation; and
  c. at said site for installation, providing a force to bend said solar absorber into a convex shape, wherein said solar absorber has said convex shape when said solar absorber is viewed from outside said solar absorber;
  d. connecting said solar absorber second end to said backing wall with said first element and said second element, wherein said first element and said second element have a gap there between and are configured for holding said solar absorber second end so said solar absorber has said convex shape, wherein said convex shape provides a plenum for air flow, wherein said plenum extends in an axial direction between said solar absorber and said backing wall, wherein distance between said solar absorber and said backing wall defines a plenum depth, wherein said plenum depth is sufficient under most of said solar absorber so air entering said plenum through most of said solar absorber is pulled primarily in said axial direction; and
  e. connecting said plurality of absorber and conduit units so said plurality of solar absorbers are aligned, said plurality of backing walls are aligned, and said plurality of plenums are aligned and so when the mechanism for flowing air is connected, air entering a plenum of a first of said plurality of connected absorber and conduit units passes in said axial direction through a plenum of a second of said plurality of connected absorber and conduit units.

35. A method as recited in claim 34, further comprising providing a base, wherein in (a) said backing wall is flat against said base.

36. A method as recited in claim 35, wherein said solar absorber has a width between said solar absorber first and second ends when said solar absorber is lying flat, wherein said solar absorber has a rigidity sufficient to provide and maintain its convex light absorbing surface shape when supported only along said solar absorber first and second ends wherein distance between said solar absorber first and second ends when in said an convex shape is less than said width when lying flat.

37. A method as recited in claim 35, further comprising tilting said backing wall with respect to said base at said site for installation.

38. A method as recited in claim 35, further comprising providing a hinge and connecting said solar absorber first end to said backing wall with said hinge.

39. A method as recited in claim 34, wherein said first element includes a first retaining bracket and wherein said second element includes a second retaining bracket, wherein said connecting includes holding said convex solar absorber second end with said first retaining bracket and with said second retaining bracket with said gap there between.

* * * * *